US005926817A

United States Patent [19]
Christeson et al.

[11] Patent Number: 5,926,817

[45] Date of Patent: Jul. 20, 1999

[54] GRAPHICAL USER INTERFACE-BASED, CLIENT-SERVER SYSTEM AND METHOD FOR DECISION MAKING APPLICATIONS

[75] Inventors: William Christeson; Venkatesan Kailasam, both of Colorado Springs, Colo.; Atul Kedar, Falls Church, Va.; Praveen Khanna, Colorado Springs, Colo.; Darryl J. Temmel, Herndon; Paul W. Waldo, III, Powhatan, both of Va.

[73] Assignee: MCI Communications Corporation, Washington, D.C.

[21] Appl. No.: 08/581,679

[22] Filed: Dec. 29, 1995

[51] Int. Cl.[6] .......... G06F 17/30

[52] U.S. Cl. .......... 707/10; 707/8; 707/104

[58] Field of Search .......... 395/601, 610; 707/10, 8, 104

[56] References Cited

U.S. PATENT DOCUMENTS

| | | | |
|---|---|---|---|
| 4,692,858 | 9/1987 | Redford et al. | 364/200 |
| 5,185,857 | 2/1993 | Rozmanith et al. | 395/148 |
| 5,379,424 | 1/1995 | Morimoto et al. | 707/10 |
| 5,418,945 | 5/1995 | Carter et al. | 707/10 |
| 5,422,674 | 6/1995 | Hooper et al. | 348/409 |
| 5,463,381 | 10/1995 | Ryu et al. | 707/10 |
| 5,493,607 | 2/1996 | Arumainayagam et al. | 379/88 |
| 5,493,638 | 2/1996 | Hooper et al. | 395/135 |
| 5,493,728 | 2/1996 | Solton et al. | 707/10 |
| 5,495,602 | 2/1996 | Harada et al. | 707/10 |
| 5,504,893 | 4/1996 | Kawashima et al. | 707/10 |
| 5,504,921 | 4/1996 | Dev et al. | 707/10 |
| 5,506,984 | 4/1996 | Miller | 707/10 |
| 5,511,208 | 4/1996 | Boyles et al. | 395/800 |
| 5,519,858 | 5/1996 | Walton et al. | 707/10 |
| 5,542,072 | 7/1996 | Kawashima et al. | 707/10 |
| 5,553,280 | 9/1996 | Fortier | 707/10 |
| 5,566,069 | 10/1996 | Clark, Jr. et al. | 364/420 |
| 5,594,663 | 1/1997 | Messaros et al. | 364/550 |
| 5,619,555 | 4/1997 | Fenton et al. | 379/67 |
| 5,625,816 | 4/1997 | Burdick et al. | 395/614 |
| 5,629,978 | 5/1997 | Blumhardt et al. | 379/201 |
| 5,632,011 | 5/1997 | Landfield et al. | 395/326 |
| 5,758,126 | 5/1998 | Daniels et al. | 395/500 |
| 5,787,402 | 7/1998 | Potter et al. | 705/37 |

OTHER PUBLICATIONS

Date, C. J., ed., in: An Introduction to Database Systems, Addison–Wesley Publishing Company, Inc.: Reading, Mass., pp. 617–640 (1990).

*Primary Examiner*—Paul R. Lintz
*Assistant Examiner*—Frantz Coby

[57] ABSTRACT

A client-server system and method providing real time access to a variety of database systems, for decision making applications, such as dynamic price quoting, product/service configuration and ordering, and billing verification. The system and method uses a graphical user interface to provide a user transparent and seamless access to the database systems.

14 Claims, 20 Drawing Sheets

INTER-OFFICE CHANNEL (IOC) QUOTING

Output From IRIS 106

Feature Code
Feature Description
Install Rate
Recurring Rate
Fixed Rate
Per Mile Rate
Short Haul Rate Input to IRIS 106

Service Type
Wire Quantity
Speed
NPA/NXX 1
NPA/NXX 2
Inter-City /
Intra-City Flag
Date

GRAPHICAL USER INTERFACE-BASED, CLIENT-SERVER SYSTEM AND METHOD FOR DECISION MAKING APPLICATIONS

BACKGROUND OF THE INVENTION

1. Field of the Invention

The present invention relates to client-server systems and methods. More particularly, the present invention relates to graphical user interface-based, client-server systems and methods for decision making applications.

2. Related Art

Typically an enterprise (e.g., any commercial, scientific, technical, or other organization) has various independent databases on multiple personal, workstation, or mainframe computer systems. Conventionally, database systems were designed with a narrow focus, that is, support for a single application of an enterprise's operations. For example, a manufacturing enterprise commonly would have accounting, product, and planning functions each supported by mutually exclusive databases.

In these systems, an end user (user) typically interacts with each of the database systems from an online terminal using a user interface unique to the particular database, requiring that the user not only learn the semantics of each interface, but also requiring the invocation of each interface for those database systems which the user desires to access. Furthermore, the decision maker also is typically required to resort to using hard copy print outs and manuals to get the information which is not readily accessible online.

Moreover, databases are increasingly being used for other kinds of applications, other hand the single enterprise operation for which they were originally designed. A prominent example of this is multiple databases which are being accessed to support decision making functions of an enterprise which typically requires not only access to summary or descriptive information, but also real time operational information.

As such, more enterprises are using client-server systems consisting of a collection of databases and/or database sites and an interconnection communication network. One of the advantages of client-server systems is that such systems mirror enterprises themselves which are typically distributed into divisions, departments, projects, etcetera.

Commonly these conventional client-server systems have several limitations. Namely, these systems do not have seamless interfaces to provide a nondistributed database system appearance to the user. That is, these systems tend not to operate transparently on data that is spread across a variety of different databases, managed by a variety of different database systems, running on a variety of different machines, supported by a variety of different operating systems, and connected together by a variety of different communication networks. "Transparently" means that the application operates from a logical point of view, as if the data were accessed by a single system running on a single machine. Indeed, many of these conventional systems are more akin to remote data access or distributed processing systems in which the user is acutely aware that the data is remotely located on several databases and has to behave accordingly. Furthermore, these conventional systems do not provide an interface tailored to the needs of the user to provide enhanced response time and use.

SUMMARY OF THE INVENTION

The graphical user interface-based, client-server computer system and method of the present invention provides a user real time access to database information, stored in a plurality of database systems, for decision making applications, such as price quoting.

One feature is that the present invention provides the user with a friendly graphical interface with transparent access the plurality of database systems. Another feature of the present invention is that it allows for concurrent user requests.

Another feature of the present invention is that it automatically provides the user with mandatory features of the application and allows the user to select/unselect optional features via the graphical user interface, thereby providing immediate feedback with respect to the user's selections.

The foregoing and other features and advantages of the present invention will be apparent from the following, more particular description of the preferred embodiments of the invention, as illustrated in the accompanying drawings.

BRIEF DESCRIPTION OF THE FIGURES

Referring now to the drawings which form a part of this original disclosure.

DETAILED DESCRIPTION OF THE REFERRED EMBODIMENTS

Figure 1:
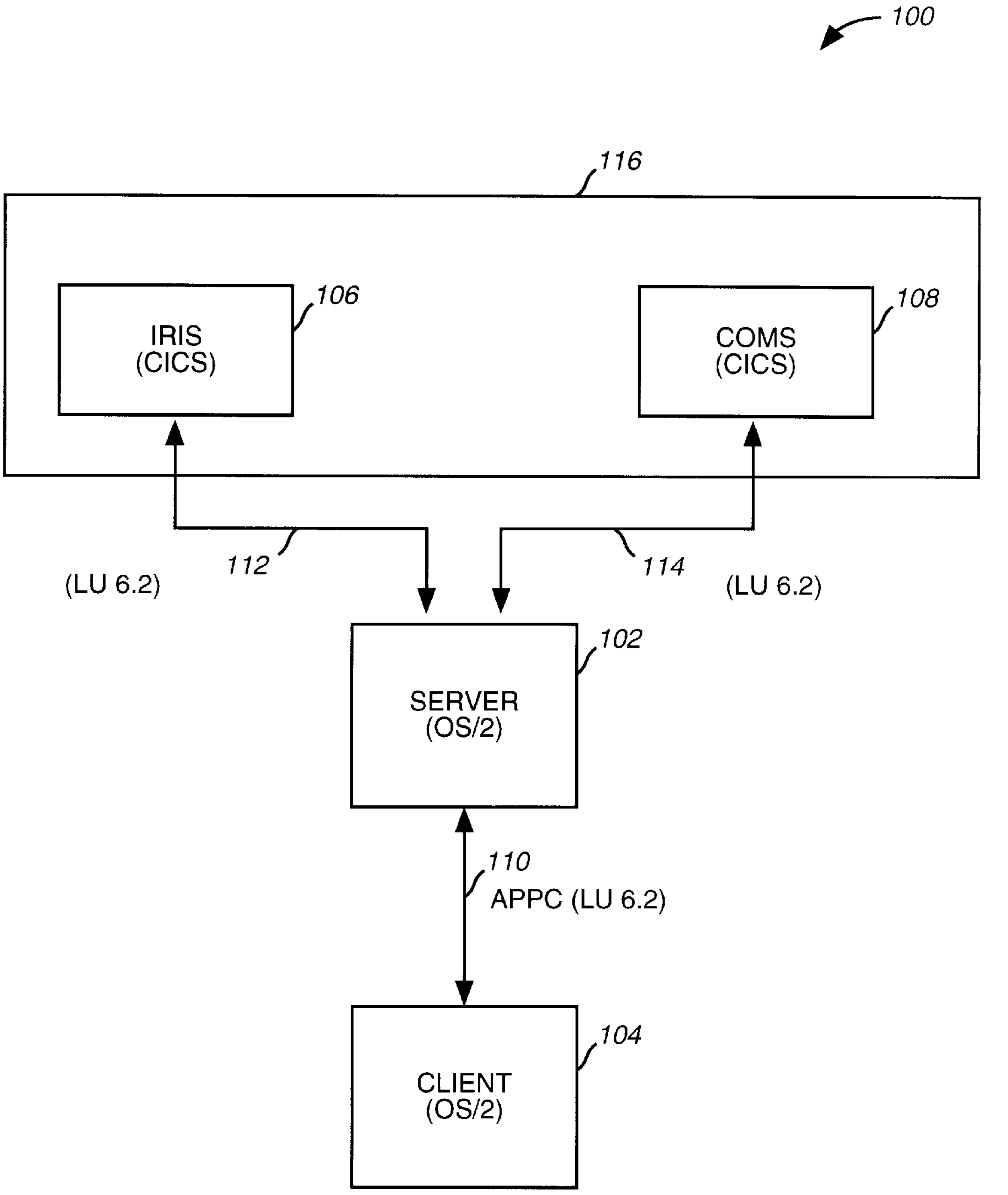
FIG. 1 illustrates a general hardware/software environment of a preferred embodiment of the present invention.

The preferred embodiments of the invention are discussed in detail below. While specific model numbers and/or configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements. Also in the figures, the left most digit of each reference number corresponds to the figure in which the reference number is first used.

ENVIRONMENT

The first preferred embodiment of the present invention provides a dynamic price quoting system and method for customer service coordinators, sales team members (e.g., technical service managers, technical consultants), support informational organizations, and billing groups of a communication service company, such as long distance carriers (e.g., MCI, AT&T, and Sprint) and local carriers (e.g., Bell Atlantic and Bell South). While this preferred embodiment describes a particular application (i.e., dynamic price quoting), its teachings are readily applicable to other applications, such as product/service ordering and billing verification. It should be noted that the present invention described herein, with respect to a communication service company, is also adapted for use with any type of customer-based enterprise.

The following illustrates an example of the context in which this embodiment of the present invention is used. Suppose a customer wants a price quote for a dedicated telephone line between the customer's facilities in Colorado Springs, Colo. and Seattle, Wash. The first associated charge is the cost of an access line (ALCC) from the customer's Colorado facility to a dedicated terminal (point of presence (POP)) provided in a Colorado Springs office of the service company. Similarly, another physical connection is required from the customer's Seattle facility to another dedicated terminal in a Seattle office of the service company. In essence, the access line is a physical connection with the telephone network of the service company. The second cost is for an inter-office channel (IOC) service connection between the dedicated terminals (or service company offices). A third potential cost is for customer premise equipment (CPE) that is typically leased to the customer, such as public branch exchanges (PBX), routers, channel banks, multiplexors, and data cards. Correspondingly, a consolidated quote (including the cost for ALCC, CPE, and IOC) is an end-to-end (ETE) quote.

Typically, to provide a price quote, the service company representative logs onto a number of mainframes screens to access different databases and receive service description and configuration information and updated rate charges to respond to the customer's request. Since all the requisite information is generally not online, the representative has to also use manuals (books). As such, the quoting process is slow and tedious, and for any thing other than the most straight forward request, the quote cannot be provided immediately to the customer. Nor can the representative provide dynamic "what if" quoting. As such, the customer receives less than optimal assistance.

The preferred embodiment provides the service company representative with a graphical user interface (GUI) which is used to more efficiently quote the customer various types of telecommunication line configurations and rate charge with respect to ALCC, CPE, IOC, and ETE charges as well as pricing plan and access volume discount information. More particularly, the preferred embodiment is a client-server system and method with user friendly graphical inquiry capabilities for real time, transparent access to distributed databases containing the requisite price quoting information. In addition, the preferred embodiment provides the representative with informational data of mandatory and optional features.

As such, changes, additions, or deletions to rate charges in the underlying databases are reflected immediately with each quote. The same applies to changes to access types and service types. Descriptions of services, are updated daily. In addition, the preferred embodiment allows for dynamic rate information not only for the current rates, but also past and future rates (since contracts typically extend across periods of time of different rates). As such, the system of the preferred embodiment can also research past billing problems (billing verification).

As discussed below, other salient features of the preferred embodiment include: multi-thread applications; error messages and solutions; selection/deselection of optional features; dynamic discount changes; store, retrieve, and export data; print queries/quotes/features; and ergonomic features such as user alterative screen fonts.

The preferred embodiment allows the representative to work on and submit multiple queries in different windows concurrently. For example, the representative could submit a CPE query while concurrently running ALCC and IOC queries in the background.

Error messages are displayed with solutions. For example, if the communication link between two computer systems is down, the present invention provides a list of possible causes and solutions for that error.

The preferred embodiment also allows the representative to select/deselect optional features, thus providing the customer with the corresponding price, with respect to variously featured configurations.

The representative can select among the various types of discount plans applicable to the selected configuration for a tailored customer solution. Moreover, the representative can dynamically change discount percentages, and the effect of the new discounts on the final rates is seen immediately. Thus, the present invention enhances the decision making process for the customer by giving the customer deeper insight into selecting cost effective options.

The preferred embodiment provides for storing/retrieving of queries, quotes, features and discount information to/from files on hard disk or diskette. Accordingly, customer data can be transferred from one computer system to another and also stored in an organized manner. Data can also be exported in format compatible with that of industry standard spreadsheet packages, such as like Lotus 123, Quatro Pro, etc. In addition, the representative can print all or selected queries/quotes/features.

Ergonomic features of the preferred embodiment include user alterative screen fonts and a status bar to display information, such as the time a file is printed or exported, or the status of I/O between computer systems (e.g., a processing display of "Retrieving ALCC feature rates").

General Hardware and Software Environment

FIG. 1 illustrates a general hardware/software environment 100 in which a preferred embodiment of the present invention can operate. Environment 100 includes a server computer system 102 operably interconnected with a client computer system 104, and a mainframe computer system 116. As will be apparent to a person skilled in the relevant art, the present invention can also have a plurality of server, client, and database computer systems similarly configured.

While any personal computer, workstation, or mainframe computer can be utilized for any of the computing components of the present invention, in this preferred embodiment, server 102 and client 104 are Intel Pentium and 486 based personal computers with IBM OS/2, Revision 2.1, operating systems, respectively. Server 102 and client 104 also have a IBM Communication Manager/2, Revision 1.11 layered on top of each operating system. In addition, server 102 has a database package, IBM Database 2 OS/2 (DB2/2).

Database systems 106 (Integrated Reference Information System, (MRIS)) and 108 (Circuit Order Management System, (COMS)) are two application specific systems utilizing a IBM DB2 database and a Software AG Adadas database, respectively. Database system 106 and 108 run on mainframe 116, which is a IBM 390 series mainframe with a IBM Multiple Virtual Storage (MVS) operating system. In addition, database systems 106 and 108 each have transaction processing systems (TPS), such as the well known IBM Customer Information Control System (CICS), layered on top of the operating system.

The interconnection between server 102 and client 104 is a token ring network (TRN) 110, using the Advanced Program-to-Program Communication (APPC), generally know as the IBM Systems Network Architecture (SNA) LU 6.2 communication protocol. Interconnections 112 and 114 between server 102 and database systems 106 and 108 also use the APPC LU 6.2 protocol.

Overall Functionality

Figure 2:
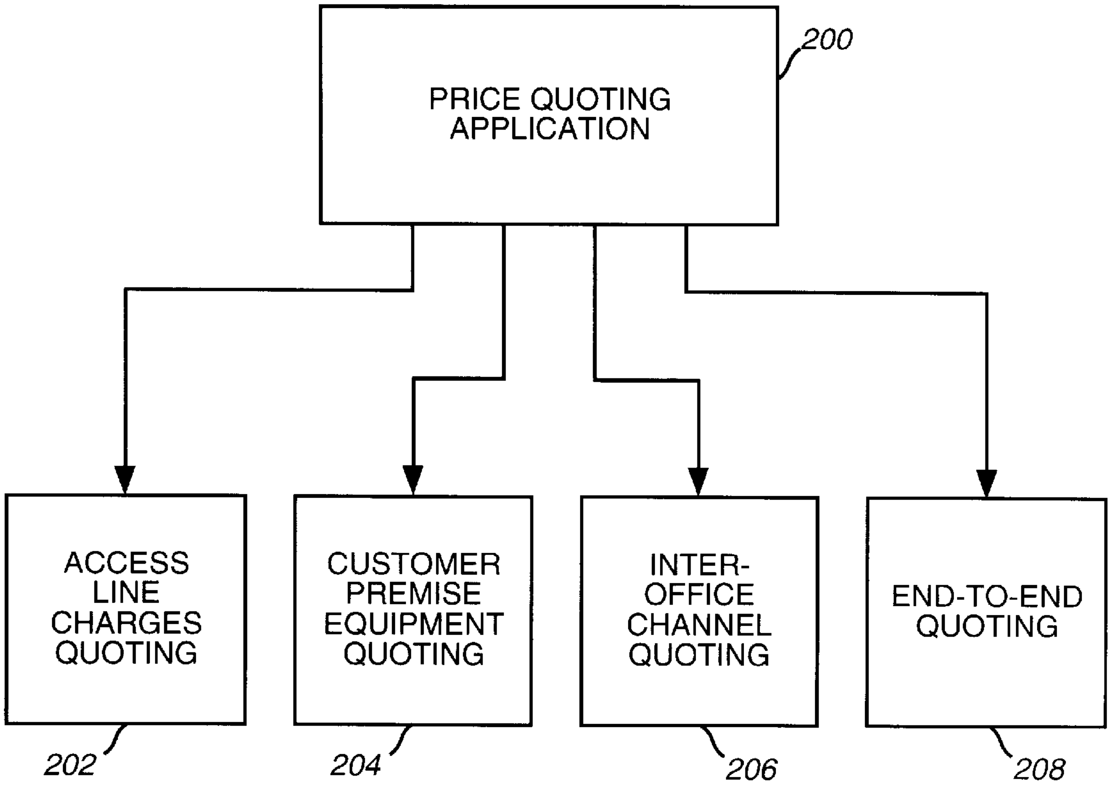
FIG. 2 illustrates a block diagram of a quoting application program of the preferred embodiment of the present invention.

The client-server price quoting application software 200 of preferred embodiment, discussed in further detail below, is partitioned in accordance with the various types of quote charges. As shown in FIG. 2, the application software 200 includes an Access Line Charges Quoting (ALCC) module 202, a Customer Premise Equipment Quoting (CPE) module 204, Inter-Office Channel Quoting (IOC) module 206, and End-To-End (ETE) quoting module 208.

The following is a general illustration of the process flow of the preferred embodiment via menu options, which are provided by two of these software modules, ALCC 202 and IOC 206.

ALCC Query Creation, Submission, and Discount Selection

Figure 3:
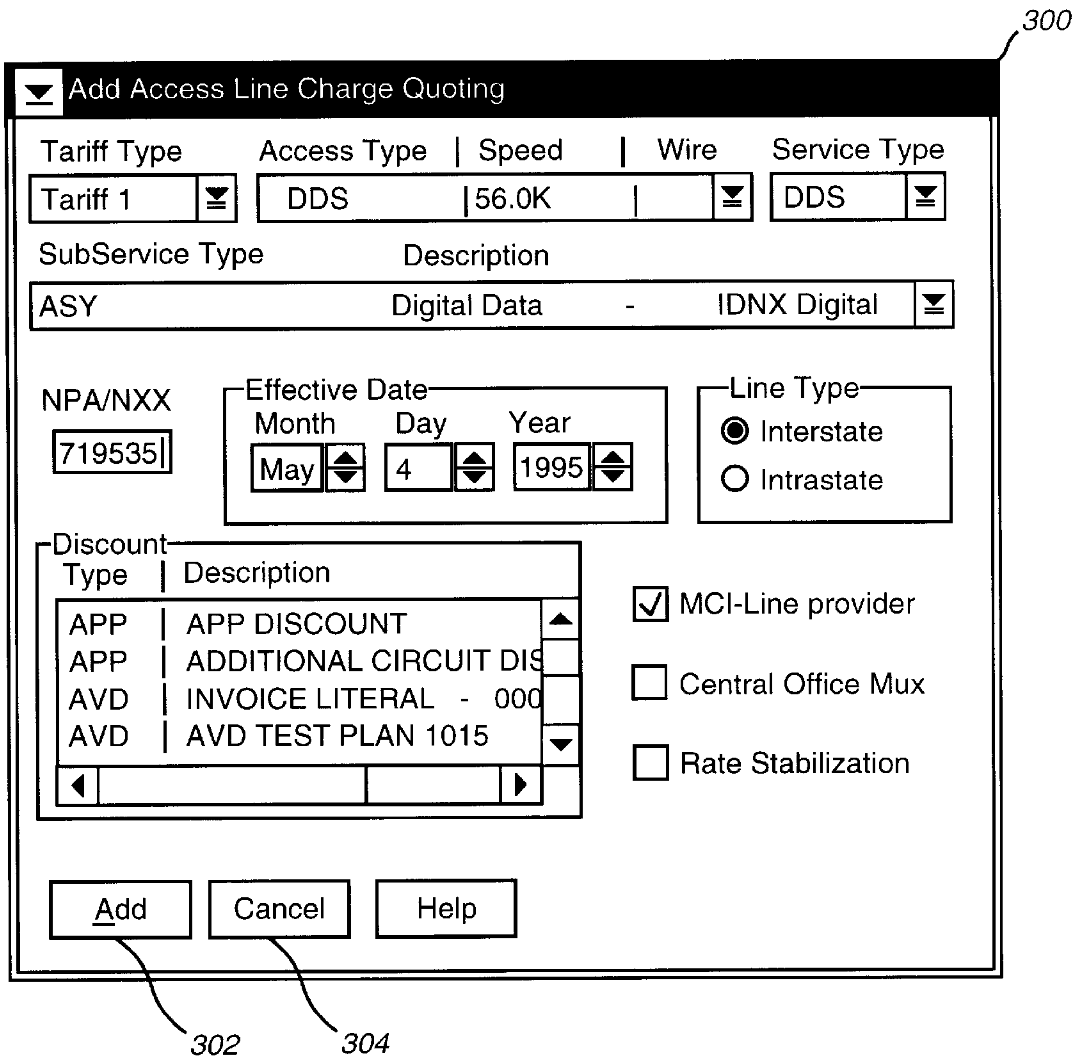
FIG. 3 illustrates an Add Access Line Charge (ALCC) Quoting Screen.

To make ALCC, queries the representative (user) selects "Quoting" from a top-bar menu option on a main screen (the main screen is not represented in the figures). Subsequently, the user selects "ALCC" (at the highest menu level, also not shown in the figures) delineating the four types of quoting supported by the preferred embodiment (i.e., ALCC, CPE, IOC, and ETE). The representative is generally provided with two options: creation of a new set of queries ("New") or retrieval of an existing file of queries ("Open"). In response to a selection of the "New" option, the Add ALCC Quoting screen 300 appears, as presented in FIG. 3/Table 1.

Alternatively, a selection of the "Open" option presents the representative with a load screen similar to that discussed with reference to FIG. 9/Table 7. The representative either types in a file name or selects the desired file from a displayed list. The queries of the loaded file then populate an ALCC Quoting spreadsheet screen 400, as presented in FIG. 4/Table 2.

TABLE 1

FIG. 2: Add ALCC Quoting Screen

Access: - Main screen, quoting menu, choose "ALCC" and then choose "New".
- In ALCC Quote spreadsheet screen 400, click on <Add> push button 408.

| Selection | Description |
|---|---|
| Add 302 | Adds query into the ALCC Quote Spreadsheet 400. |
| Cancel 304 | Query is discarded. |

Once the representative has completed entering all required fields and has selected the appropriate optional fields, the representative by clicking on an <Add> push button 302 adds a query 418 to ALCC Quoting spreadsheet screen 400. The representative can also continue to make/add other queries until all desired queries have been created.

TABLE 2

Figure 4:
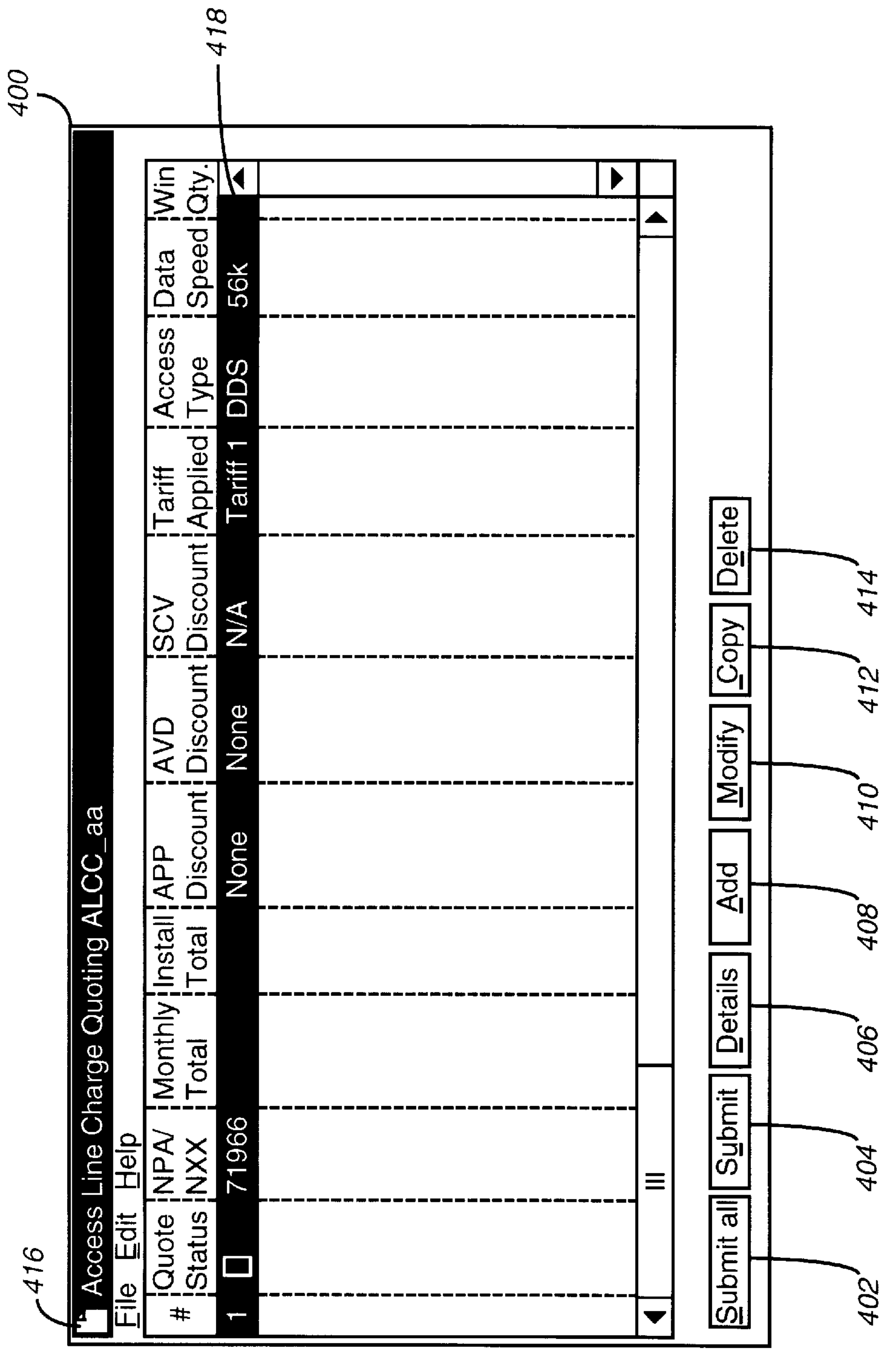
FIG. 4 illustrates an ALCC Quoting Spreadsheet Screen.

FIG. 4: ALCC Quoting Spreadsheet Screen

Access: ALCC Add Screen 300, click on <Add> or <Cancel> push buttons 302 and 304.
Main screen, quoting menu, choose "ALCC", and choose "Open", and in Load ALCC window (similar to Open Files screen 900), choose a valid file name and click on "OK" button.

| Selection | Description |
|---|---|
| Submit All 402 | Submits all the queries to databases 106 and 108 for pricing. |
| Submit 404 | Submits the selected queries to databases 106 and 108 for pricing. |
| Details 406 | Displays a ALCC Details Notebook Page, which contains information regarding ALCC features, discounts, and penalties. |
| Add 408 | Displays ALCC Add screen 300 for adding new ALCC quotes(s). |
| Modify 410 | Displays a ALCC Modify screen for changing an existing quote. |
| Copy 412 | Displays a ALCC Copy screen for copying ALCC quotes. |
| Delete 414 | Displays a Delete Confirmation screen before deleting any existing queries or quotes. |

Once all queries have been created or loaded onto ALCC Quoting spreadsheet screen 400, the representative can retrieve the rate and discount information from databases system 106 and 108 via either <Submit> or <Submit all> push buttons 402 and 404. When submitted, monthly rate information will populate onto ALCC Quoting spreadsheet 400 for the submitted queries and a Quote Status icon 416 will change from an image of a pad and pencil to that of an envelope. The displayed rates at this junction do not reflect discount savings.

To view/select ALCC features, rates, or discounts for a quote, the representative selects <Details> push button 406 on ALCC Line Charge Quoting spreadsheet screen 400. In response, a notebook 500 appears having a number of pages, including a ALCC Features page 502, a ALCC Accessing Pricing Plan (APP) page 504, a ALCC Access Volume Discounts (AVD) page 506, and a ALCC Penalties page 514, as presented in FIGS. 5–8/Tables 3–6. ALCC Features notebook page 502 displays the required and optional ALCC features and charges for the selected quote. The representative at this junction may deselect any optional feature(s) which is/are not desired. The preferred embodiment, in response, correspondingly subtracts the deselected feature's rates from the overall ALCC quote.

TABLE 3

Figure 5:
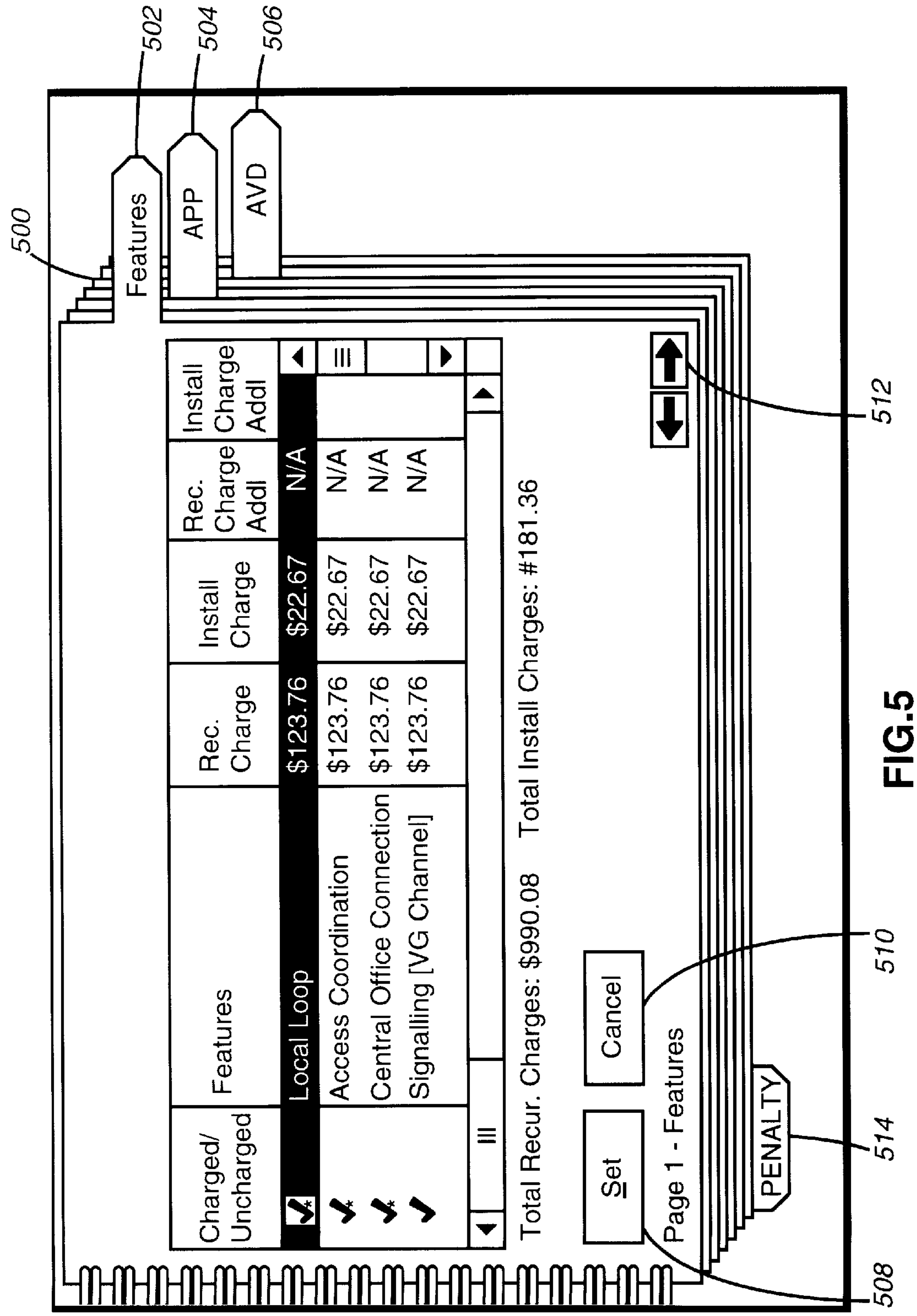
FIG. 5 illustrates an ALCC Features Notebook Page.

FIG. 5: ALCC Features Notebook Page

Access: - ALCC Quote spreadsheet screen 400, highlight quote 418, and either click on <Details> push button 406 or double click on quote 418.
- ALCC APP Discount notebook page 506, click on left arrow 600.
- Click on Features notebook tab 502 from ALCC APP Discount, AVD, or Penalties notebook pages, 504, 506, or 514.

| Selection | Description |
|---|---|
| Set 508 | Accepts changes made, if any, and returns to ALCC Quote spreadsheet screen 400. |
| Cancel 510 | Cancels the changes made, and returns to ALCC Quote spreadsheet screen 400. |
| Right Arrow 512 | Displays APP Discount page 504. |

The representative can then view the discount options by turning to the next two pages of notebook 500. AlCC APP Discounts page 504 is presented in FIG. 6/Table 4. The third page of the notebook, ALCC AVD 506, is presented in FIG. 7/Table 5. This page contains discount values, if they were chosen at the time of adding or modifying the ALCC query. The preferred embodiment then applies any discount(s) selected by the representative to the feature rates eligible for discounting, as indicated by databases 106 and 108, thus decreasing the overall ALCC quote.

TABLE 4

Figure 6:
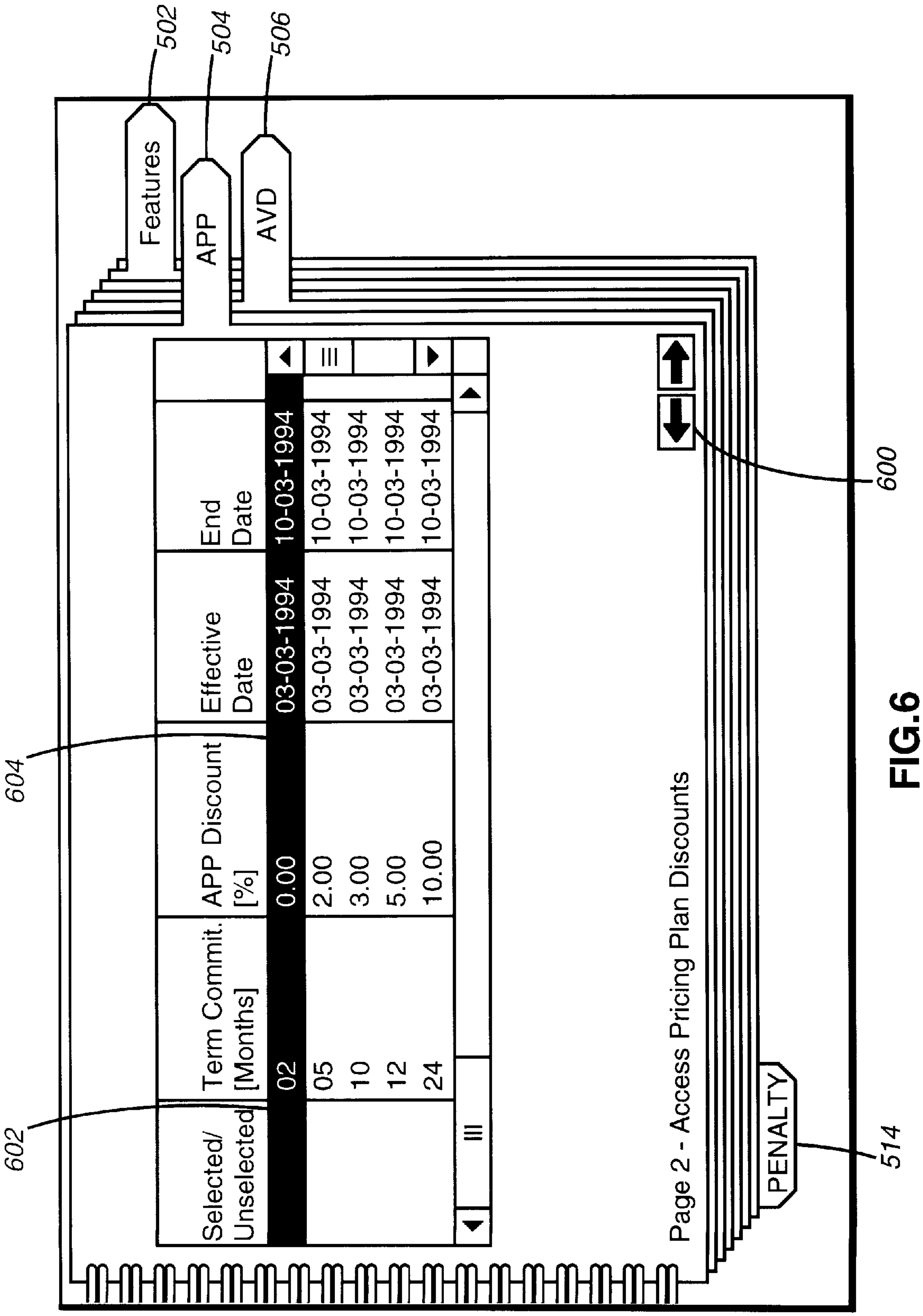
FIG. 6 illustrates an Access Pricing Plan Discount (APP) Notebook Page.

FIG. 6: ALCC APP Discounts Notebook Page

Access: - ALCC Features notebook page 502, click on right arrow 512.
- ALCC AVD notebook page 506, click on left arrow 704.
- Click on ALCC APP tab 504 from ALCC Features, AVD, or Penalties notebook pages 502, 506, and 514, respectively.
Note: ALCC APP discounts must have been chosen previously for this to appear.

| Selection | Description |
|---|---|
| Reset (not shown) | Cancels the changes made, if any. |
| Selected/Deselected 600 | Double click on a line 604 will put a check mark in Selected/Unselected column 602, and apply the discount chosen to the IOC rates. |

TABLE 5

Figure 7:
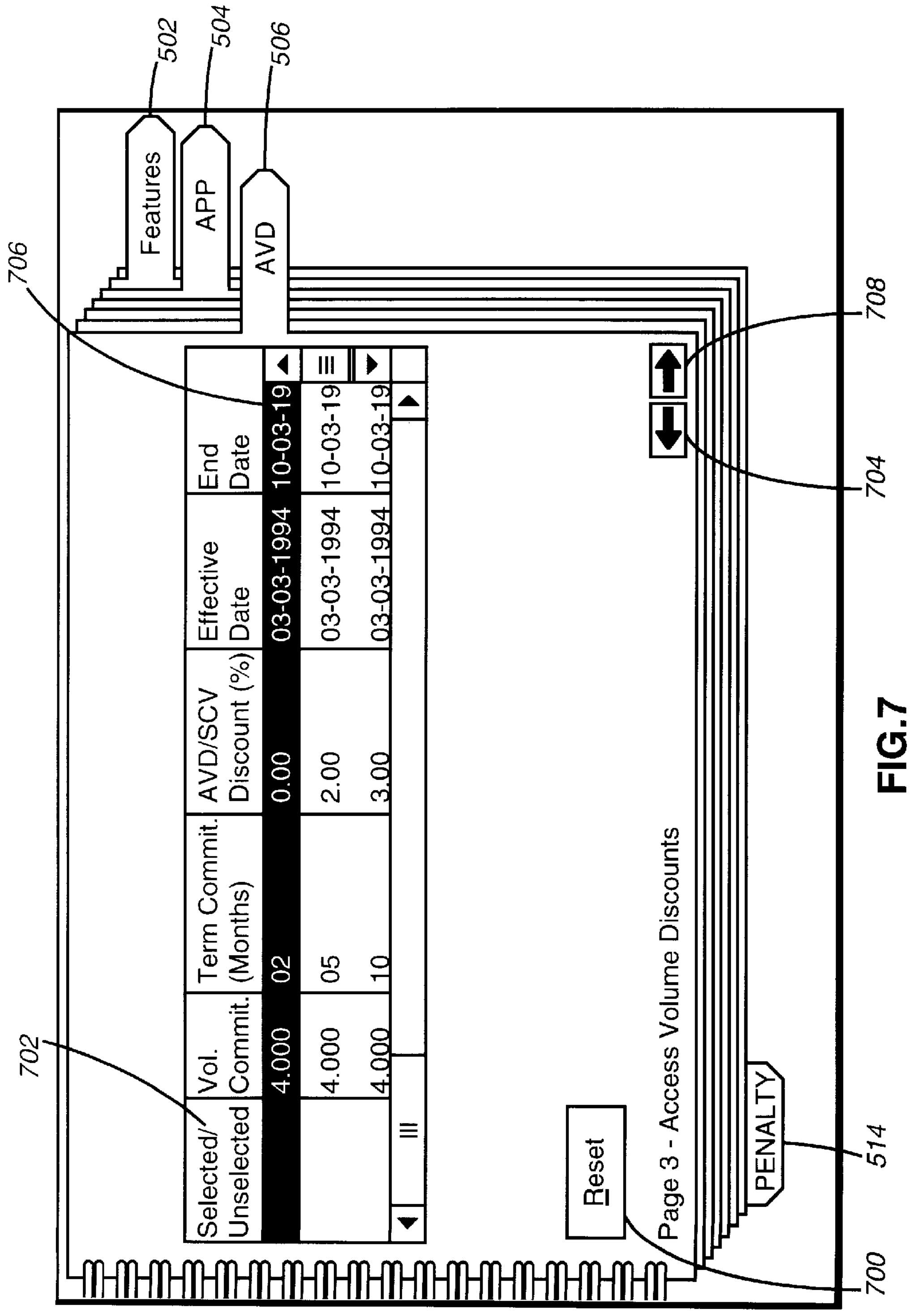
FIG. 7 illustrates an ALCC Access Volume Discounts (AVD) Notebook Page.

FIG. 7: ALCC AVD Notebook Page

Access: - ALCC Features notebook page 502, click on right arrow 512.
- ALCC Penalties notebook page 514, click on left arrow 800.
- Click on AVD tab 506 from ALCC Features, APP, or Penalties notebook pages, 502, 504, and 514, respectively.
Note: ALCC AVD discounts must have been chosen previously for this to appear.

| Selection | Description |
|---|---|
| Reset 700 | Cancels the changes made, if any. |
| Selected/Unselected 702 | Double click on a line 706 will put a check mark in Selected/Unselected column 702, and apply the discount chosen to the IOC rates. |

Figure 8:
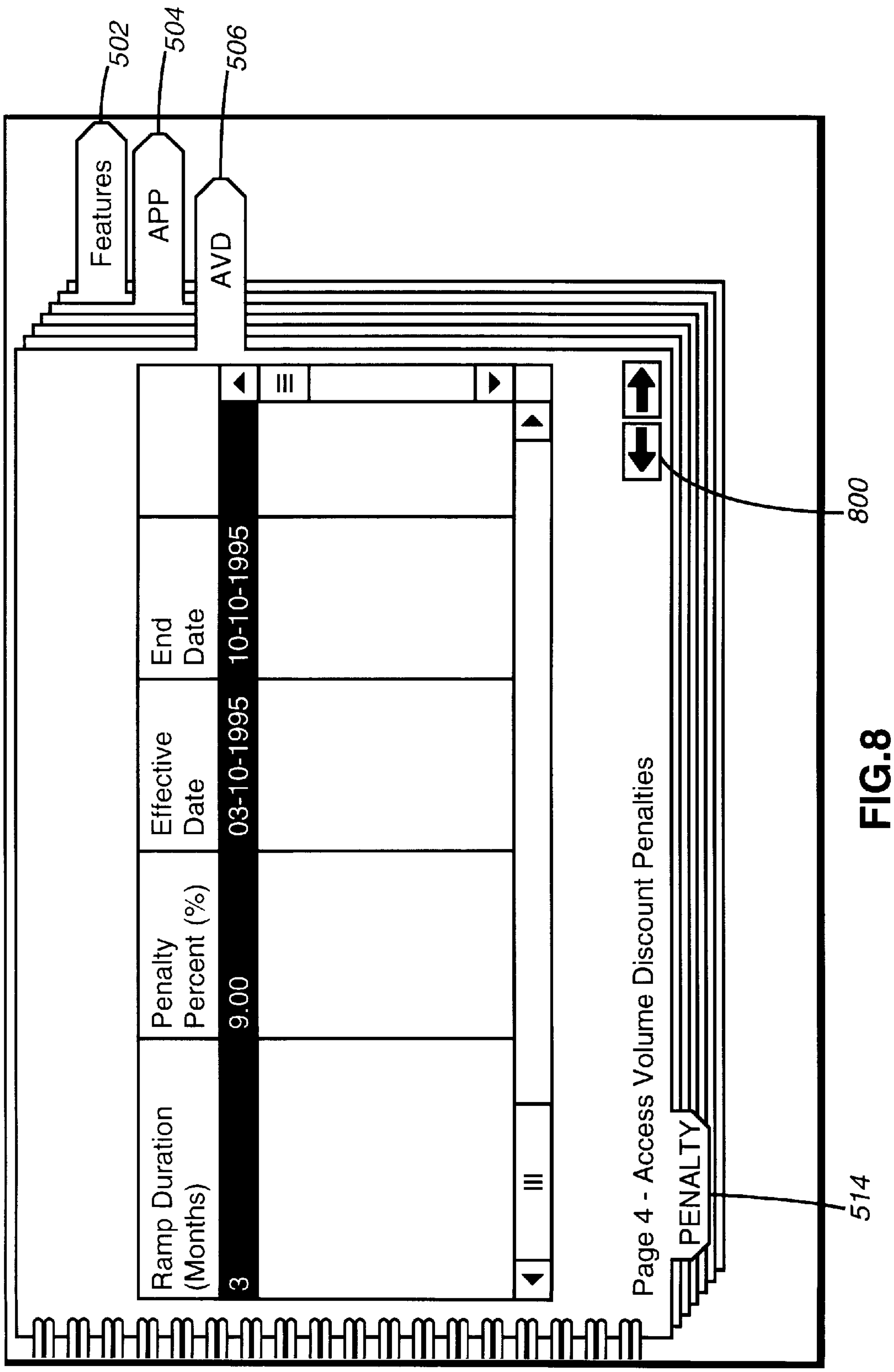
FIG. 8 illustrates an ALCC AVD and Penalty Notebook Page.

As presented in FIG. 8/Table 6, ALCC Penalties notebook page 514 displays the penalties the customer could incur if discount plan requirements are not met. This page is for informational purposes only.

TABLE 6

FIG.8: ALCC AVD Notebook Page

Access: ALCC AVD Discounts notebook page 506, click on ALCC Penalties
tab 514.
ALCC AVD Discounts notebook page 506,
click on right arrow 708.
tab

| Selection | Description |
|---|---|
| None | |

IOC Query Creation, Submission, and Discount Selection

As with ALCC queries, to create IOC queries, the representative selects the "Quoting" top-bar menu option on the main screen and then selects "IOC" (the main screen is not represented in the figures). The representative is similarly presented with two options: creation of a new set of queries ("New") or retrieval of an existing file of queries ("Open"). If the representative selects "Open," a Load IOC File screen 900 is shown, as presented in FIG. 9/Table 7. The representative then either types in a file name 906 or selects it from a list of files 908. Accordingly, queries will then populate an IOC Quoting spreadsheet screen 1100, presented in FIG. 11/Table 9.

TABLE 7

Figure 9:
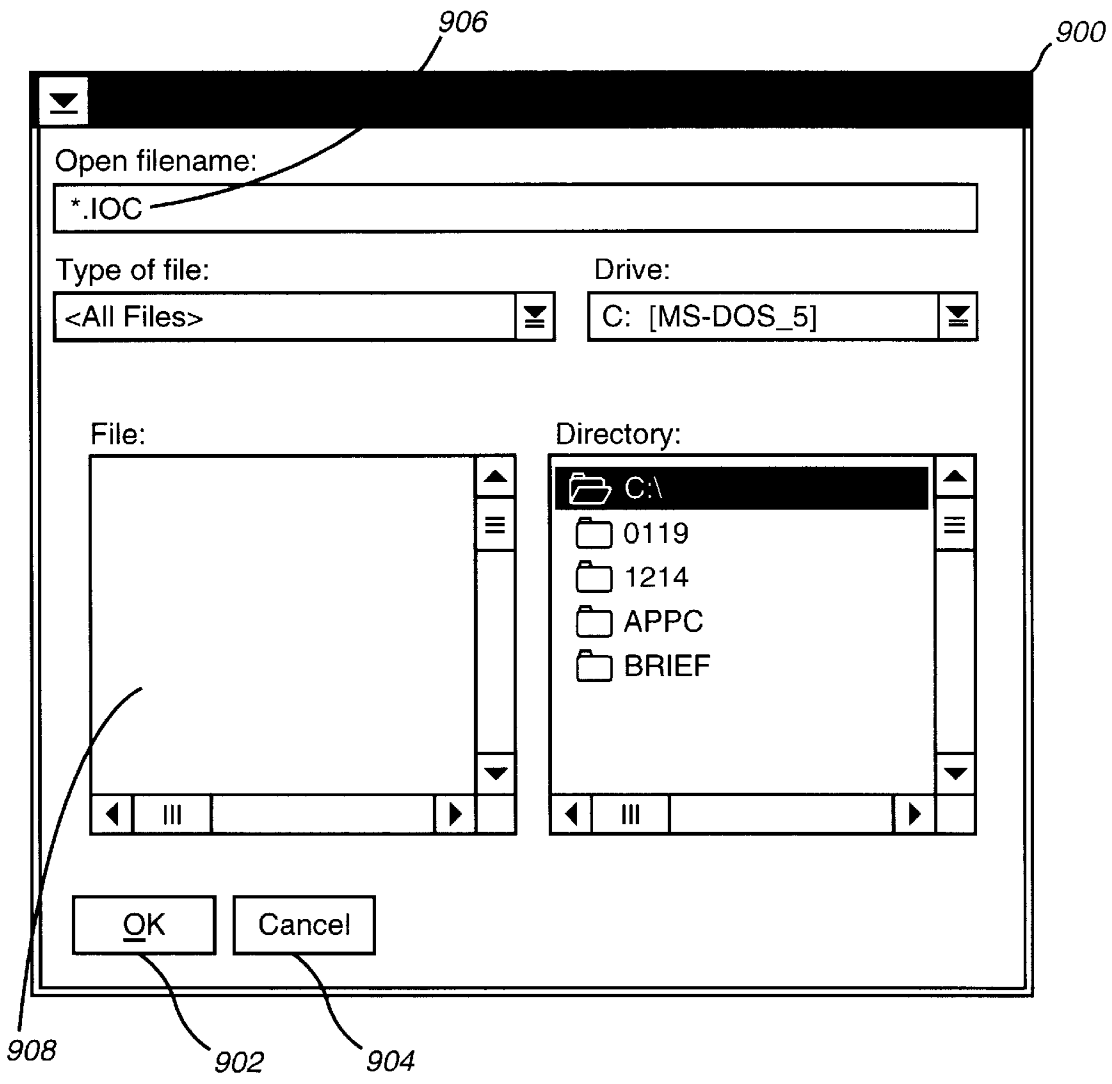
FIG. 9 illustrates an Open (Load) File Screen.

FIG. 9: Open Files (Load) Screen

Access: - Main screen, quoting menu, choose "IOC", choose "Open" option.

| Selection | Description |
|---|---|
| Ok 902 | Reads the file chosen (if it exists), loads the queries/quotes into and displays IOC Quote spreadsheet 1100. In case of error, displays an error message. |
| Cancel 904 | Returns to main screen. |

Figure 10:
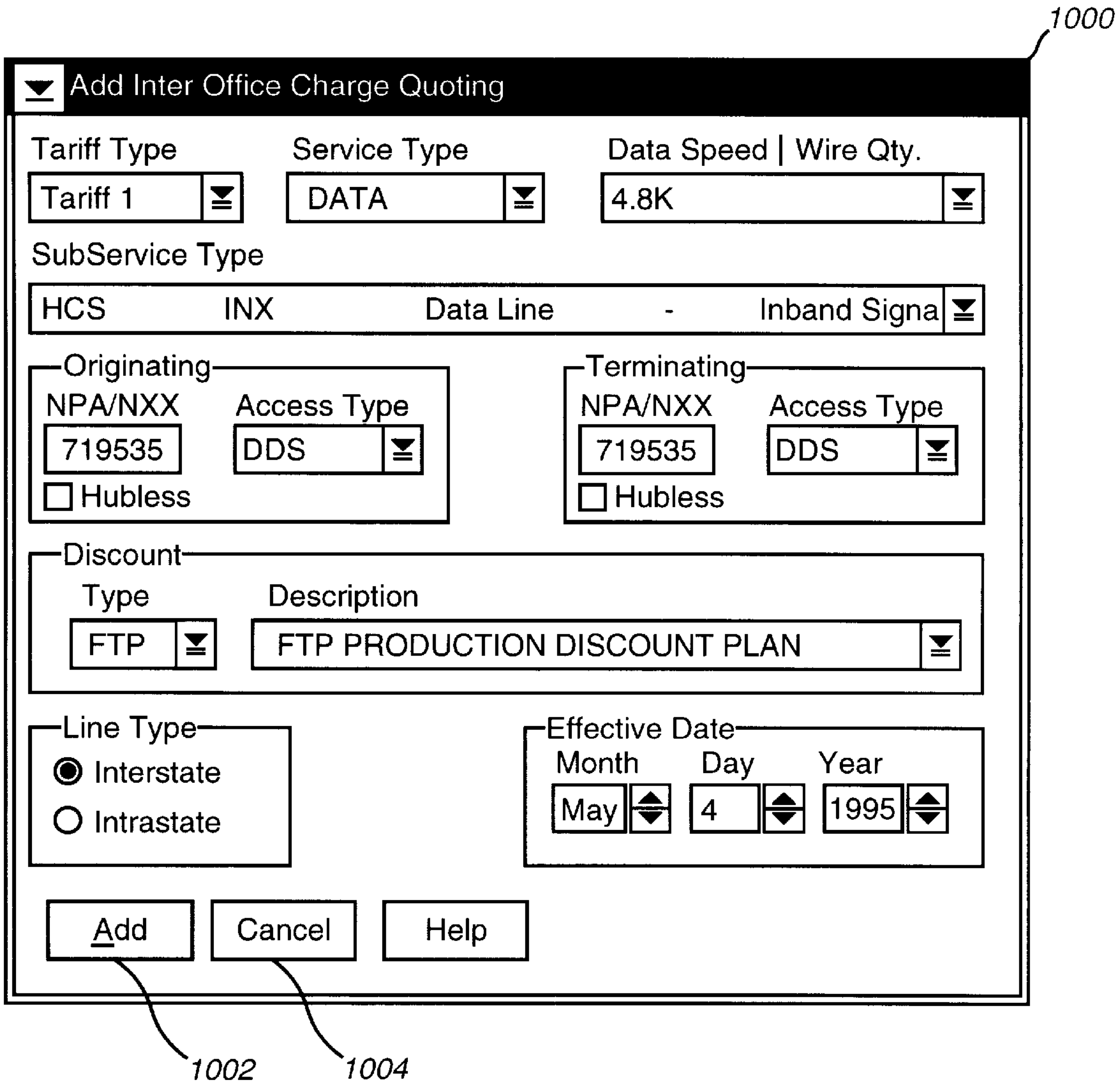
FIG. 10 illustrates an Add Inter-Office Channel (IOC) Screen.

If the representative selects "New," an Add IOC Quoting screen 1000 appears, as presented in FIG. 10/Table 8. Once the representative has completed entering all required fields and selected optional fields, by pressing an <Add > push button 1002, a query is entered into IOC Quoting spreadsheet screen 1100. The representative can continue to add queries until all desired queries have been created.

TABLE 8

FIG. 10: Add IOC Quoting Screen

Access: - Main screen, quoting menu - choose "IOC", and then choose "New".
- IOC Quoting spreadsheet screen 1100, click on <Add> push button 1108.

| Selection | Description |
|---|---|
| Add 1002 | Adds quote, and displays IOC Quoting spreadsheet 1100. |
| Cancel 1004 | Quote is discarded, IOC Quote Spreadsheet is displayed. |

TABLE 9

Figure 11:
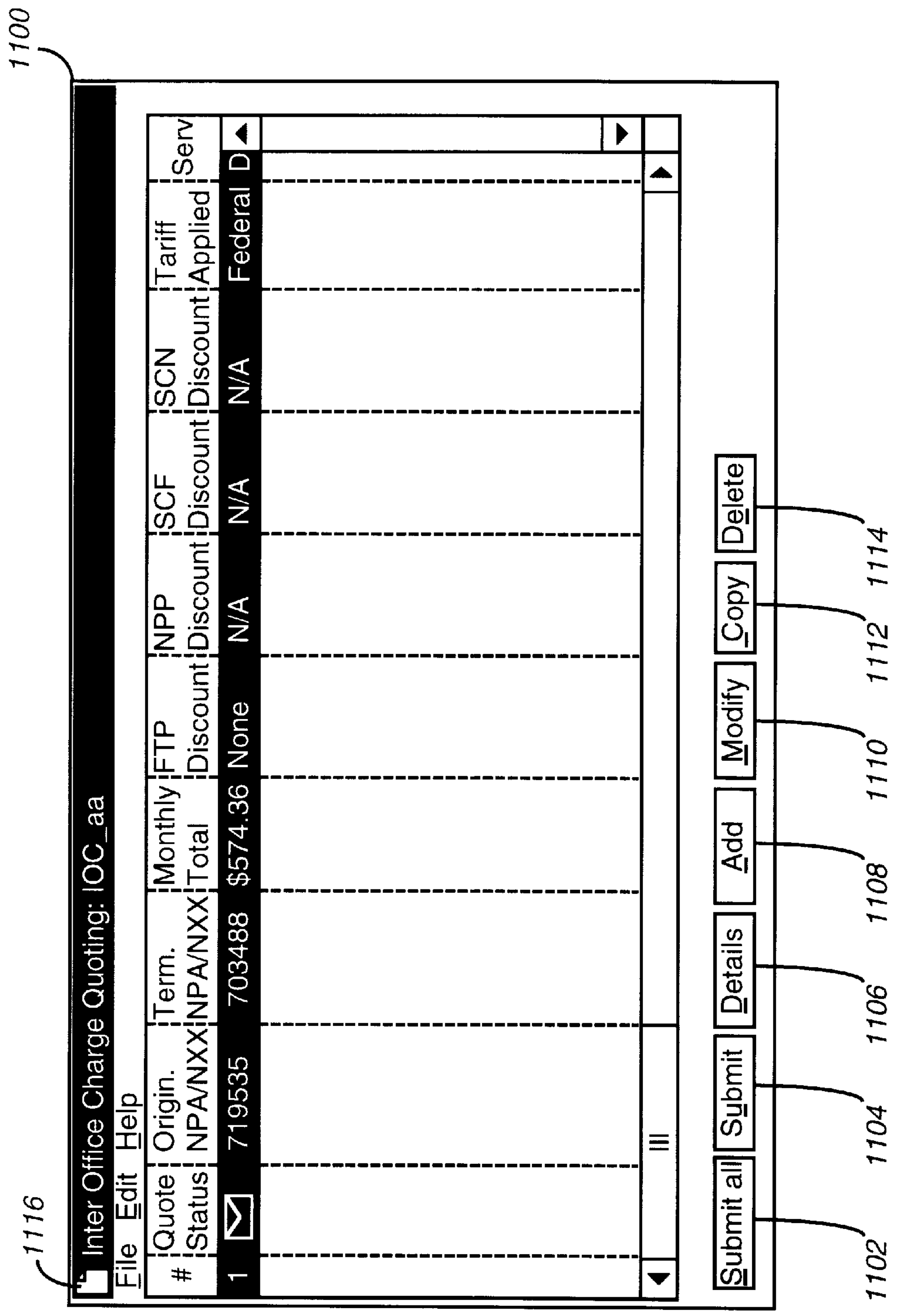
FIG. 11 illustrates an IOC Quote Spreadsheet.

FIG. 11: IOC Quoting Spreadsheet Screen

Access: - Add IOC Quoting screen 1000, click on <Add> or <Cancel> push buttons 1002 and 1004.
- Main screen, quoting menu, choose "IOC" and choose "Open", and in Load Files screen 900, choose a valid file name and click on <OK>push button 902.

| Selection | Description |
|---|---|
| Submit all 1102 | Submits all the IOC queries to databases 106 and 108 for pricing. |
| Submit 1104 | Submits the selected queries to databases 106 and 108 for pricing. |
| Details 1106 | Displays an IOC Details notebook page, which contains information about IOC Features and Rates, Discounts, and Penalties. |
| Add 1108 | Displays Add IOC Quoting screen 1000, for adding new IOC queries. |
| Modify 1110 | Displays an Modify IOC screen for modifying a selected query/quote. |
| Copy 1112 | Displays an Copy IOC screen, for copying a selected quote. |
| Delete 1114 | Displays a Delete Confirmation screen before deleting IOC queries or quotes. |

Once all queries have been created or loaded onto the IOC Quoting spreadsheet screen 1100, the representative can retrieve the rate and discount information from databases 106 and 108 via either <Submit all> or <Submit> push buttons 1102 and 1104. When submitted, monthly rate information will populate IOC Quoting spreadsheet screen 1100 for the submitted queries and a Quote Status icon 1116 will change from an image of a pad and pencil to that of an envelope. The rates at this juncture do not reflect any discount savings.

To view/select IOC features and rates or discounts for a quote, the representative clicks on <Details> push button 1106 on IOC Quoting spreadsheet screen 1100. An IOC Features/Discounts/Penalties notebook 1200 is displayed opened to an IOC Features notebook page 1202, which shows the IOC features and charges for the selected quote, as presented in FIG. 12/Table 10.

TABLE 10

Figure 12:
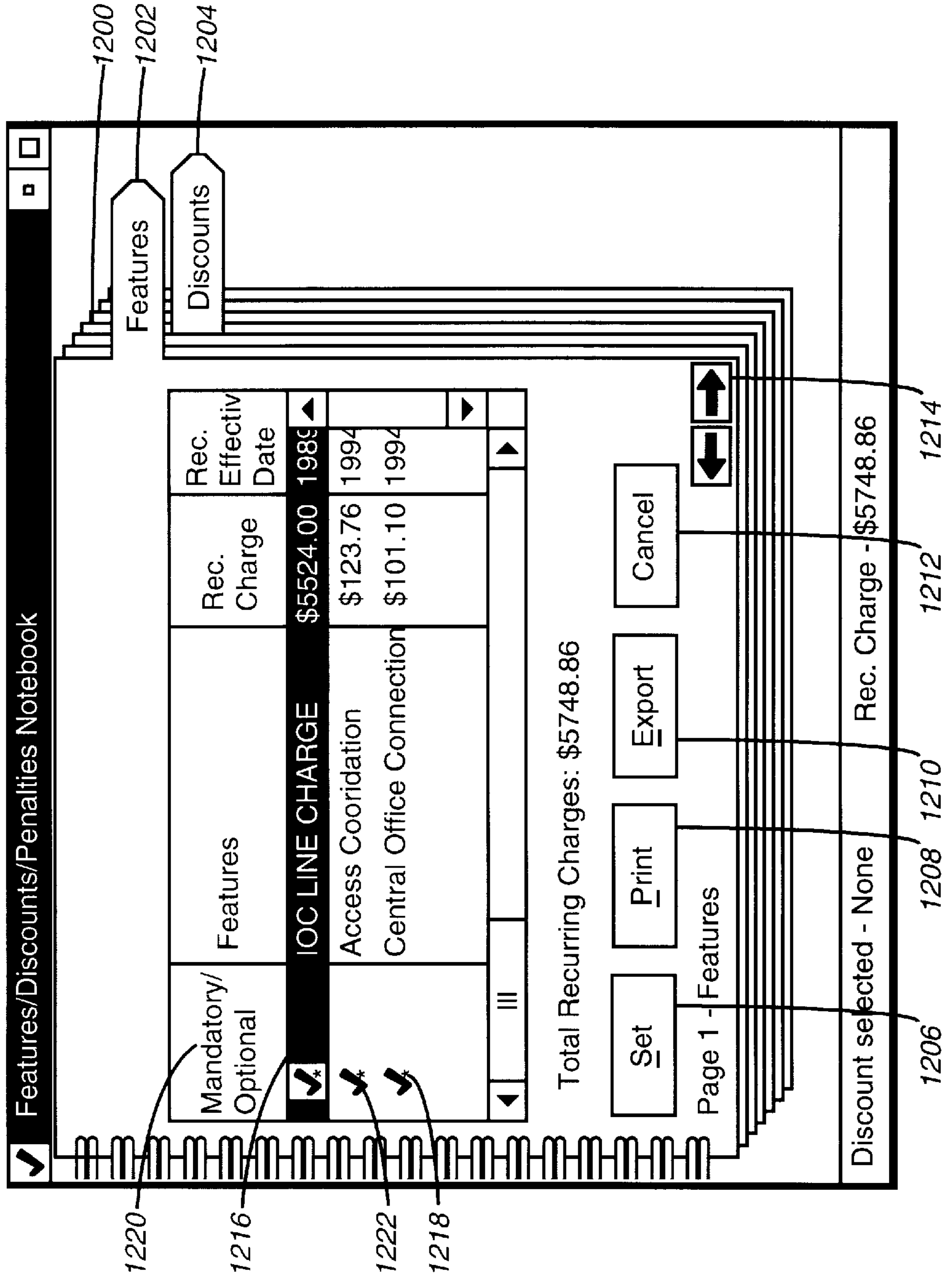
FIG. 12 illustrates an IOC Features and Rates Notebook Page.

FIG. 12: IOC Features Notebook Page

Access: - IOC Quoting spreadsheet screen 1100, highlight a quote, and either click on <Details> push button 1106 or double click on the quote.

| Selection | Description |
|---|---|
| Set 1206 | Accepts the changes made, if any, and returns to IOC Quoting spreadsheet screen 1100. |

TABLE 10-continued

FIG. 12: IOC Features Notebook Page

Access: - IOC Quoting spreadsheet screen 1100, highlight a quote, and either click on <Details> push button 1106 or double click on the quote.

| Selection | Description |
|---|---|
| Print 1208 | Prints IOC Features notebook page 1202 on a printer. |
| Export 1210 | Exports data from the current notebook page to a file. |
| Cancel 1212 | Cancels the changes made, if any, and returns to IOC Quoting spreadsheet screen 1100. |
| Right Arrow 1214 | Displays the IOC Discount notebook page 1204. |
| Mandatory/Optional 1216 | Double clicking on a line 1216 with an option feature (an optional feature does not have a "*" 1218 in the "Mandatory/Optional" column 1220) will toggle the status of the feature from/to "Selected" (represented by a tick mark 1222) to/from an "Unselected" (represented by a cross mark) status. Mandatory and optional features are shown in different colors for convenient detection by the representative. |

Figure 13:
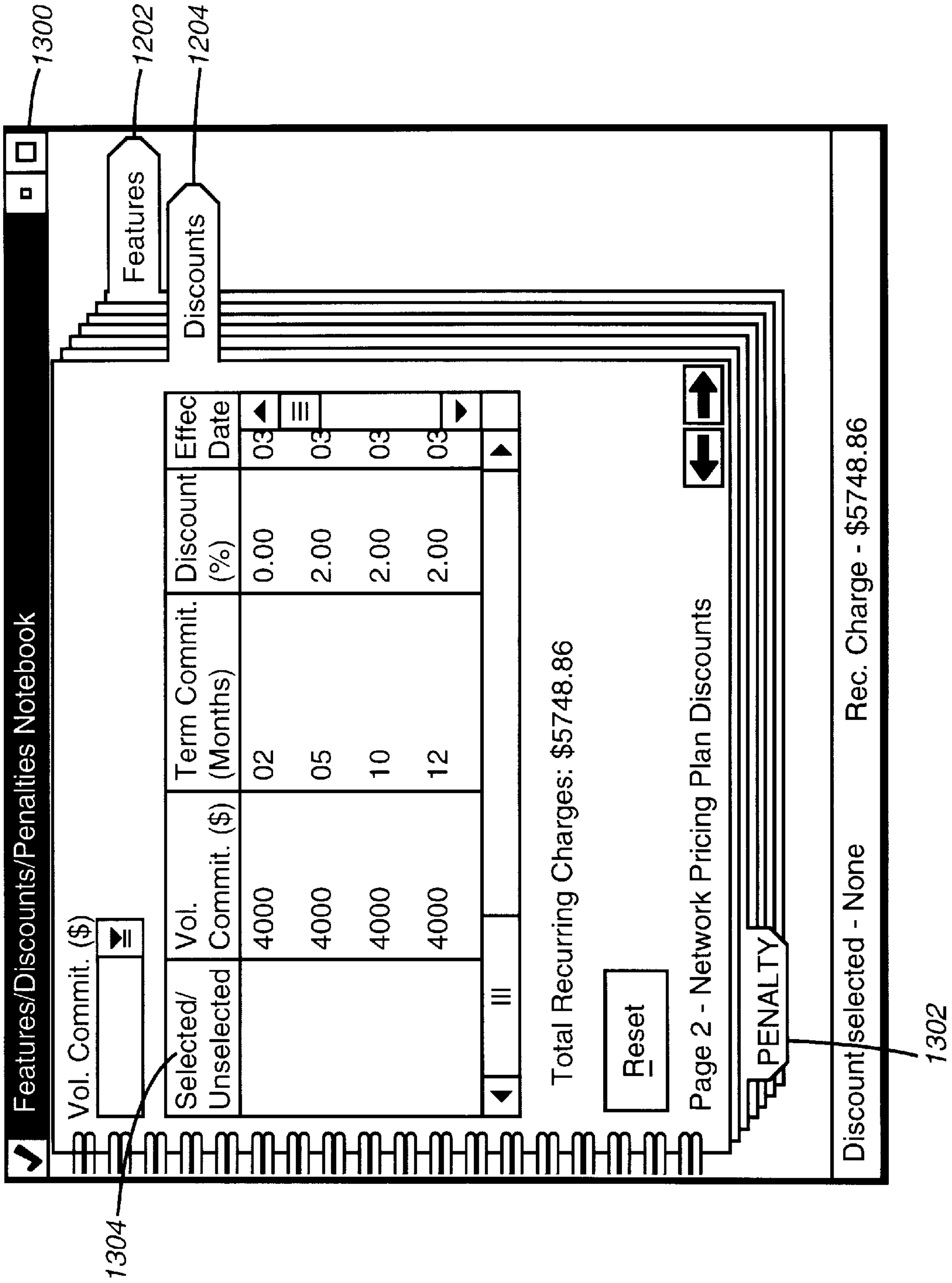
FIG. 13 illustrates an IOC Network Pricing Plan (NPP) Discount Notebook Page.
Figure 14:
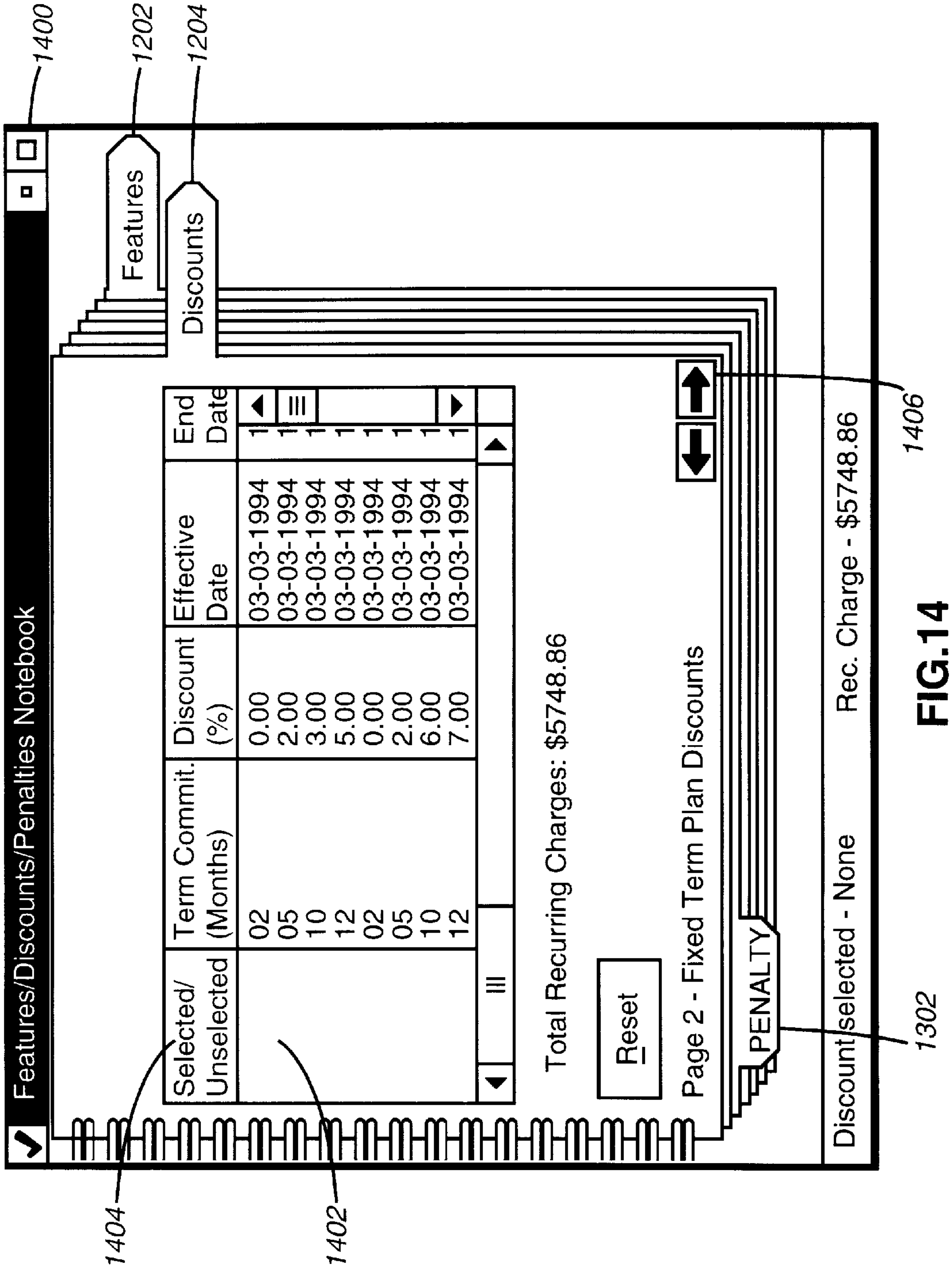
FIG. 14 illustrates an IOC Fixed Term Pricing (FTP) Discount Notebook Page.

The representative may then view the discount options by turning to the next page of the notebook, as presented in FIG. 13/Table 11, an IOC Network Pricing Plan (NPP) Discount page 1300. FIG. 14/Table 12 present an IOC Fixed Term Pricing (FTP) Discount page 1400. IOC NPP or FTP discounts are displayed depending on the discount plan selected on the Add IOC Quoting screen screen 1000 when the query was created. The preferred embodiment will apply any discount(s) selected by the representative to the feature rates which databases 106 and 108 indicate are eligible for discounting, thus decreasing the overall IOC quote.

TABLE 11

FIG. 13: IOC NPP Discount Notebook Page

Access: - IOC Features notebook page 1202, click on right arrow 1214.
- IOC Penalties notebook page 1302, click on left arrow 1500.
Note: NPP discounts must have been chosen while entering the IOC query in order to see this screen.

| Selection | Description |
|---|---|
| Penalty tab 1302 | Displays the IOC FTP Penalty notebook page 1302. |
| Selected/Unselected 1304 | Double clicking on any line will put a check mark in this column; and apply the discount chosen to the IOC rates. |

TABLE 12

FIG. 14: IOC FTP Discount Notebook Page

Access: - IOC Features notebook page 1202, click on right arrow 1214.
- IOC FTP Penalty notebook page 1302, click on left arrow 1500.
Note: FTP discounts must have been chosen while entering the IOC query in order to see this screen.

| Selection | Description |
|---|---|
| Penalty tab 1302 | Displays the IOC FTP Penalty notebook page 1302. |
| Selected/Unselected 1404 | Double clicking on a line 1402 will put a check mark in "Selected/Unselected" column 1404, and apply the discount chosen to the IOC rates |

Figure 15:
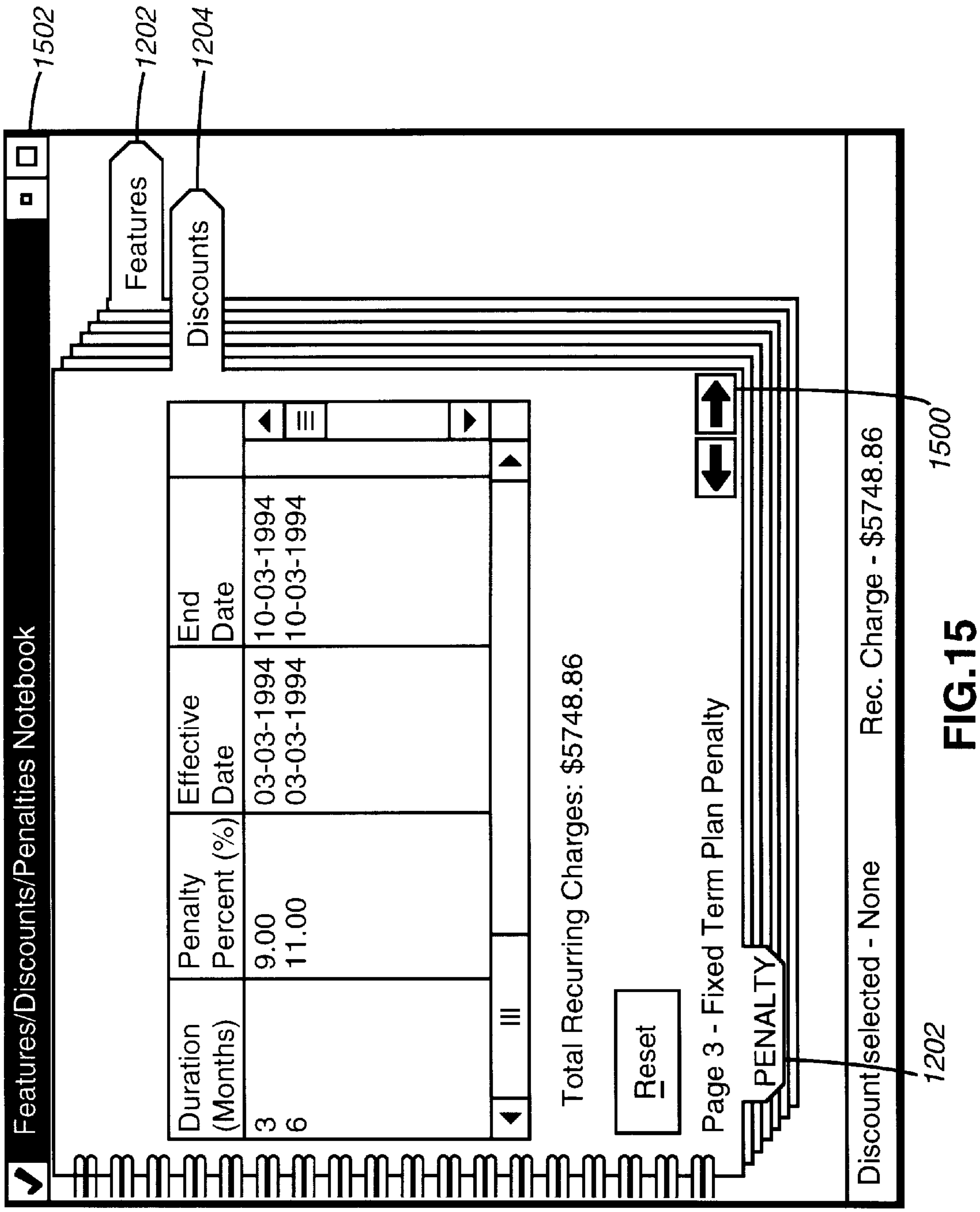
FIG. 15 illustrates an IOC Discount Penalty Notebook Page.

The last notebook page, presented in FIG. 15/Table 13, an IOC FTP Penalty notebook page 1502, shows what penalties the customer could incur if discount plan requirements are not met. This page is for informational purposes only.

TABLE 13

FIG. 15: IOC FTP Penalty Notebook Page

Access: - IOC FTP Discount notebook page 1204, click on Penalty tab 1302.
- IOC FTP Discounts notebook page 1204, click on right arrow 1406.

| Selection | Description |
|---|---|
| None | |

Software Architecture

Figure 16:
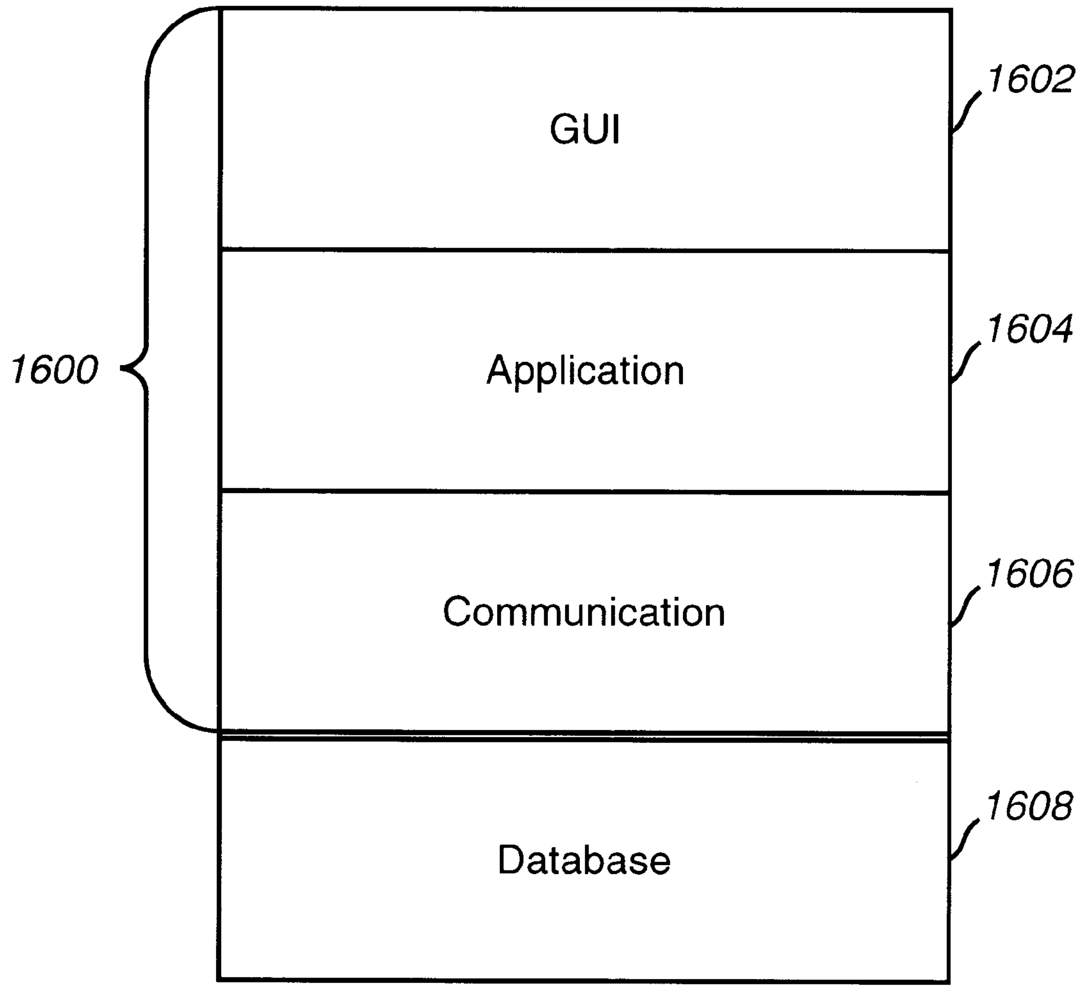
FIG. 16 illustrates software layers of the present invention.
Figure 17:
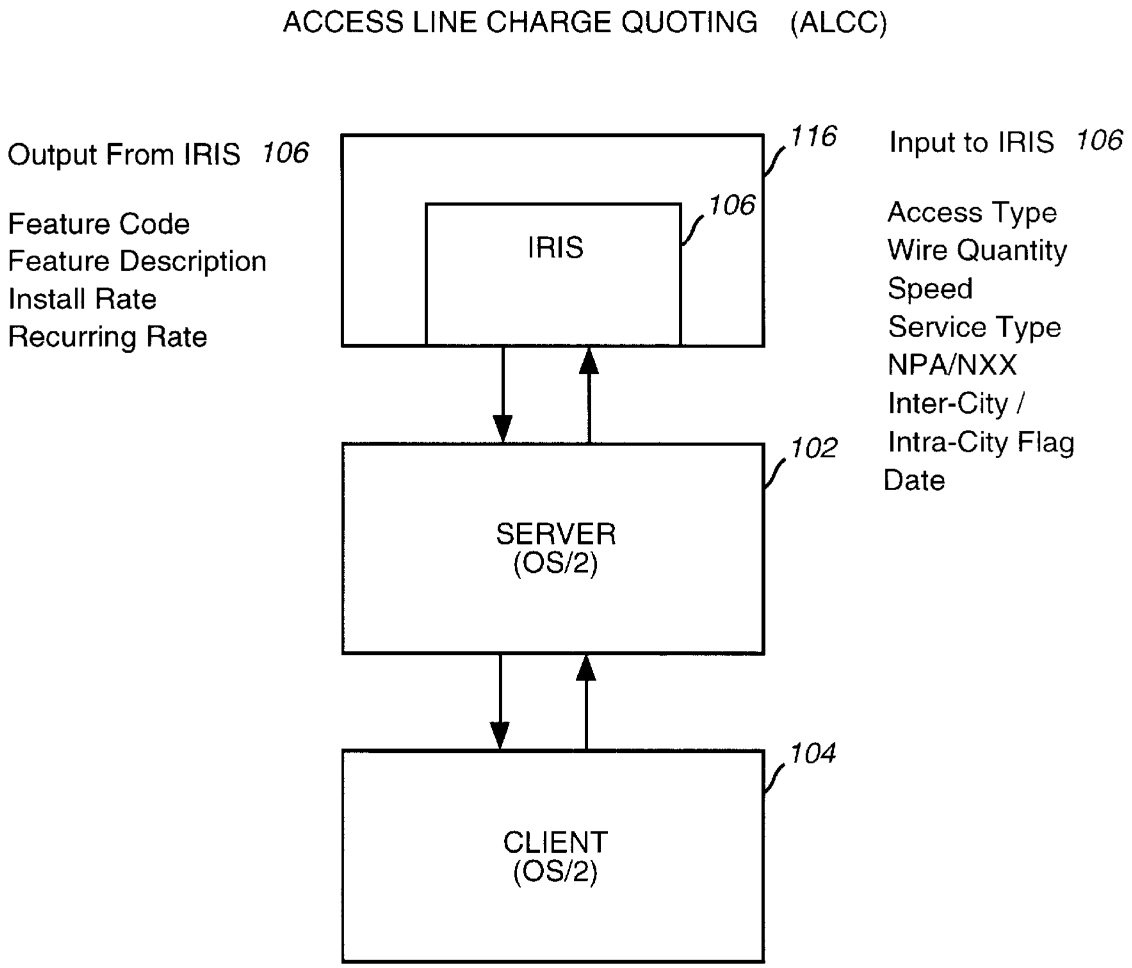
FIG. 17 illustrates a data flow diagram for ALCC quoting.
Figure 18:
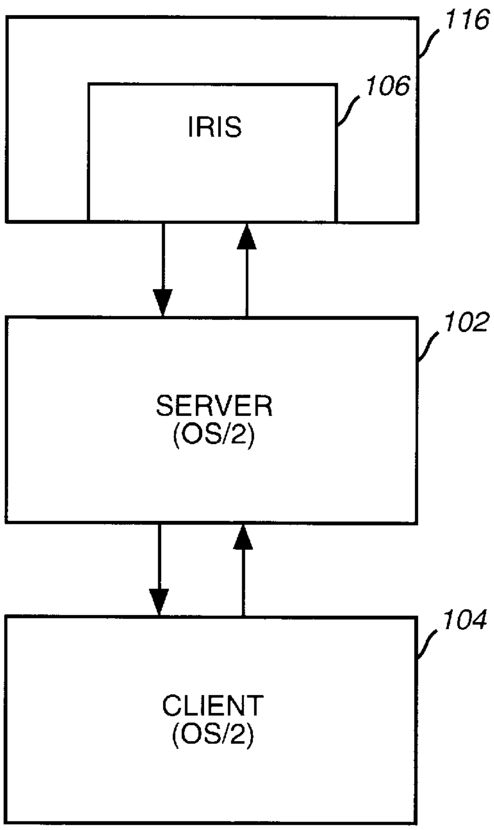
FIG. 18 illustrates a data flow diagram for CPE quoting.
Figure 19:
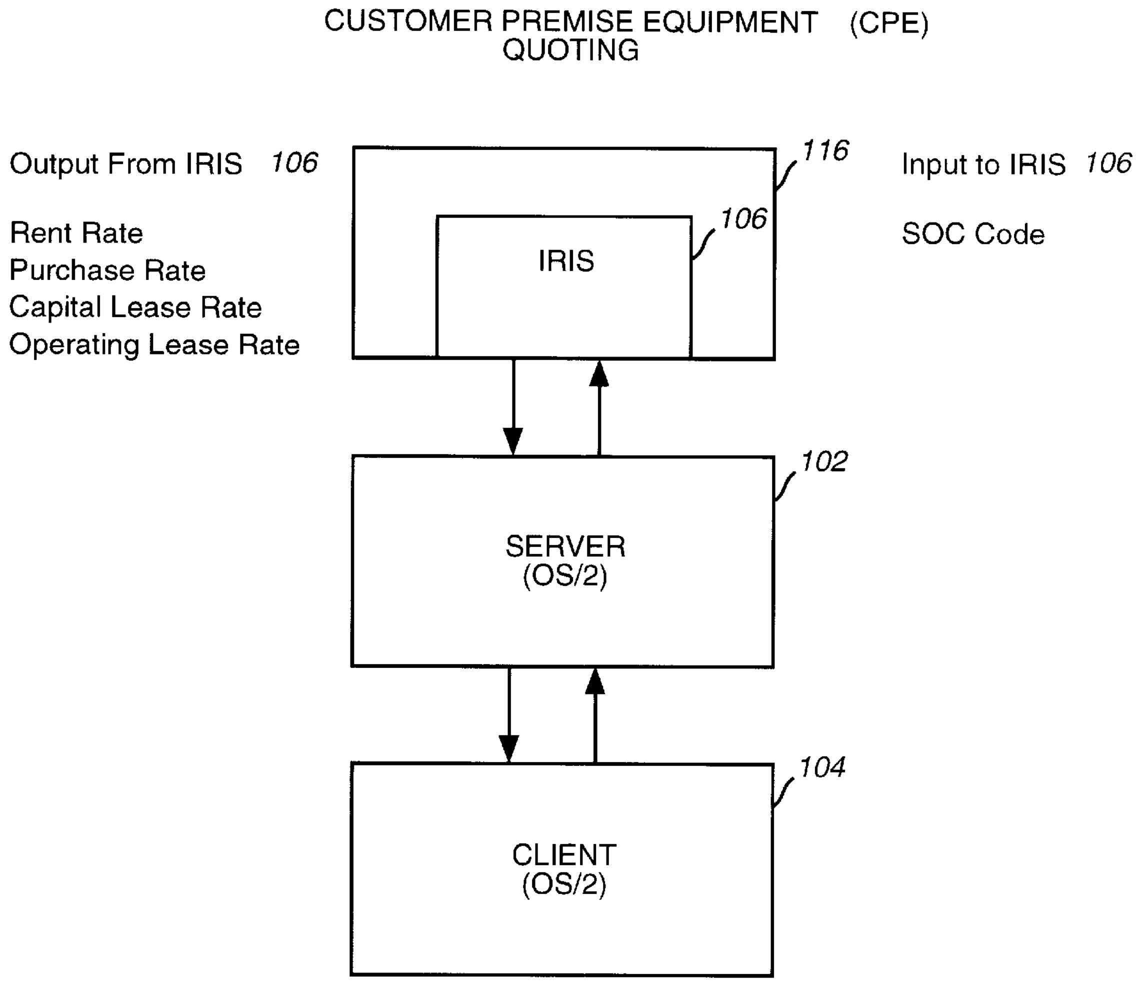
FIG. 19 illustrates a data flow diagram for IOC quoting.

As shown in FIG. 16, the preferred embodiment of the present has a client-server software structure 1600 partitioned into three layers: a GUI layer 1602, an application layer 1604, and a communication layer 1606. Structure 1600 is layered over the database systems on server 102 (e.g., DB2/2) and mainframe 106 (e.g., DB2), representatively shown as database layer 1608.

The client-server paradigm of the present invention matches the way many enterprises actually operate. That is, it is quite common for a single enterprise to operate many computers, such that the data for one portion of the enterprise is stored on one computer and that another portion is stored on another. It is also quite common for users on one machine to need at least occasional access to data stored on another.

As such, the present invention is adopted for accessing multiple computers connected together in a communication network (e.g., as shown in FIG. 1) such that a single application task (e.g., price quoting) can span several computers in the network. That is, in general, a client-server system entails a single application (e.g., client-server 1600), which operates transparently on data that is spread across a variety of different databases managed individually by a variety of different database management systems (e.g., DB2/2, DB/2, and Adadas), running on a variety of different computers (e.g., server 102 and mainframe 116) supported by a variety of different operating systems (e.g., OS/2 and MVS), and connected together by a variety of different communication networks (e.g., TRN 110). As such, the application (e.g., price quoting) operates from a logical point of view as if the data were managed by a single database management system running on a single machine. Indeed, one of the fundamental principles of a client-server system is that to the user, a client-server system should look exactly like a local or nondistributed system.

This fundamental principle is achieved by the present invention. In particular, the software layers 1602–1606 in conjunction with the data structures, discussed below, achieve such an efficient and cooperative management system of the various computers and database management systems of the present invention that much of the intercommunication is virtually transparent to the representative (user).

Furthermore, conventional client-server systems have traditionally had strongly coupled or interwoven layers. Accordingly, these conventional systems required either significant reprogramming effort or complete redesigns to incorporate new features or new software packages (e.g., new database management systems).

The present invention, in contrast, provides for complete independence between these layers by comprehensively defining the requisite inputs, outputs, and functions of each layer and defining efficient data structures. As such, each layer of the present invention can be replaced with relatively little programming effort. For example, if a more powerful database is introduced, the present invention can be updated easily, thus representing a significant advantage over these conventional systems.

In this preferred embodiment, GUI layer 1602 is preferably written in the object oriented programming language C++, with the IBM CSet case libraries. Application layer 1604 is similarly programmed with C++. However, other programming languages can be used, such C, COBOL, or Pascal. Communication layer 1606 uses APPC, however, other well-known protocols, such as TCP/IP (widely used with the Internet) can also be used. Database layer 1608 is the IBM DB2/2 and DB2. However, comparable database systems can alternatively be used with the present invention, including those commercially available from Oracle or SYBASE.

From the user perspective, GUI and application layers 1602 and 1604, defme the system. As illustrated above, the user interfaces with various menus of the preferred embodiment, which are controlled by GUI layer 1602, to implement the functions defined by application layer 1604. In this preferred embodiment, application layer 1604 is further functionally partitioned (i.e., ALCC Quoting 202, CPE Quoting 204, IOC Quoting 206, and ETE Quoting 208), as shown in FIG. 2.

To access databases systems 106 and 108, the preferred embodiment uses a message-based interface between server 102 and CICS programs on mainframe 116. Client 104 communicates with server 102 through APPC.

The present invention uses objects to communicate with mainframe 116, including an I/O object (located on client 104, as part of the application layer 1604), a communication (Comm) object (located on both server 102 and client 104 as part of the communication layer 1606), and a server object (located on server 102).

The following generally illustrates the invocation of these software objects with respect to the layers 1602–1608. In addition, FIGS. 16–19 generally illustrate the data flow between the computer systems of the preferred embodiment: client 104, server 102, and mainframe 116.

GUI 1602, with a request for data, invokes the I/O object, passing on a set of parameters. The I/O object, in turn, invokes the Comm object on client 104, which communicates with the Comm object on server 102.

The Comm object on server 102 then invokes the appropriate function that would get the requested data either from the DB2/2 database on server 102, itself, or from database systems 106 or 108 on mainframe 116. That is, once the request of data comes from client 104, the application layer of server 102 (server object) will get requested data from the database layer 1608 (DB2/2), if requested data is available, or access mainframe 116 to get the data using the Comm object. This data is then set back to client 104, and displayed its graphical display.

With reference to Appendix A, the following illustrates the data structures of the preferred embodiment. Note: "Server 102 to Mainframe 104 (IRIS database system)" and "Mainframe 104 to Server 102" structures are found in "msgiris.h", Appendix A, pages A-1 to A-18. "Client 104 to Server 102" and "Server 102 to Client 104" structures are found in "msgclint.h", Appendix A, pages A-19 to A-35. In addition, generic and message definitions are found in "hvdef.h" and "msgdef.h", Appendix A, pages 36–43.

The following functions are called by client 104 when the preferred embodiment is first invoked on client 104:

1) Get Service/Sub Service Information

Client 104 to Server 102: msgHdr

Server 102 to Mainframe 116 and back: None (data from server 102 database)

Server 102 to Client 104: msgRetSvcSubSvc

2) Get SOC Codes And CPE Payment Options

Client 104 to Server 102: $SOC_{13}$ REQUEST

Server 104 to Mainframe 116 and back: None (data from server 102 database)

Server 102 to Client 104: SOC__CODE__ARRAY

3) Get List of Discount Plans:

Client 104 to Server 102: msgHdr

Server 102 to Mainframe 116 and back: None (data from server 102 database)

Server to Client: IOC__SPECIAL__DISCOUNT__ARRAY

The following are function called when needed by client 104:

1) Get CPE Rates (called when a <Submit> push button is pressed on the CPE spreadsheet (similar to that presented with respect to FIG. 4/Table 2 and FIG. 11/Table 9):

Client 104 to Server 102: msgQueryCPE

Server 102 to Mainframe 116 and back: None (data from server 102 database)

Server 102 to Client 104: msgRetCPE

2) Get Error Information (called when there is any error from a query, and more information is needed about the error condition):

Client 104 to Server 102: msgQueryError

Server 102 to Mainframe 116 and back: msgIrisErrorReq

Server 102 to Client 104: msgRetError

3) Get APP Discount (called when <Submit> push button 404 is pressed on ALCC Quoting spreadsheet screen 400 if any APP discount plan is chosen for that query):

Client 104 to Server 102: msgQueryAPPGroups

Server 102 to Mainframe 116 and back: msglrisQueryAPPGroups

Server 102 to Client 104: msgRetAPPGroups

4) Get IOC Rates Information (called when <Submit >push button 1104 is pressed on IOC Quoting spreadsheet screen 1100):

Client 104 to Server 102: IOC__QUERY__MESSAGE

Server 102 to Mainframe 116 and back: msglrisMileage; msgIrisOCPipeRateQuery; msgIrisFeatureAvailabilityAndPricing; msgIrisDiscountSchedulesAndPenalties Server 102 to Client 104: IOC__PIPE__CHARGE; FEATURE__ARRAY;IOC__DISCOUNT__ARRAY; IOC__PENALTY__ARRAY 5) Get Access Features/Rates/Discount Eligibility Information (called when <Submit> push button 404 is pressed on the ALCC Quoting spreadsheet screen 400):

Client 104 to Server 102: RATES__AND__FEATURES__QUERY

Server 102 to Mainframe 116 and back: msgIrisFeatureAvailabilityAndPricing Server 102 to Client 104: FEATURE__ARRAY The following are called when server 102 refreshes its local database:

1) Download SOC Codes, Descriptions And CPE Rates To Server 102 local database:

Server 102 to Mainframe 116 and back: msgIRISQueryCPE

2) Download Service And Sub Service Descriptions To Server 102 From Database System 106:

Server 102 to Mainframe 116 and back: msgirisQuerySvcSubSvc

3) Download Discount Plans To Server 102 Database System 106:

Server 102 to Mainframe 116 and back: msgIrisSpecialDiscountQuery

Other Embodiments

Figure 20:
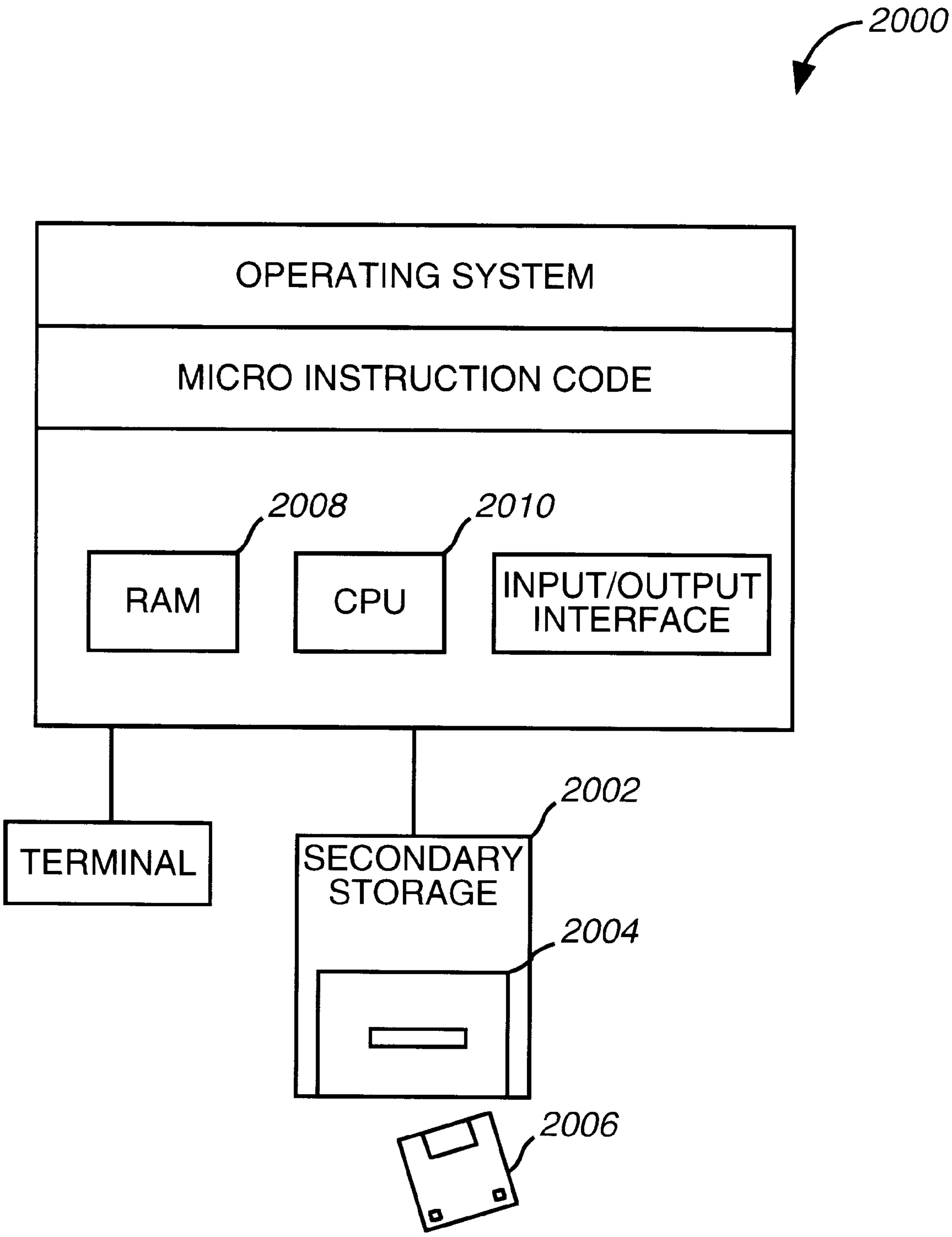
FIG. 20 illustrates a hardware environment for a computer program product embodiment of the present invention.

In another embodiment of the present invention, a computer program product, each server 102 and client 104 is a computer system 2000, as shown in FIG. 20. In particular, system includes secondary storage 2002, having a removable storage drive 2004 which reads from and/or writes to a removable storage unit 2006, in a well known manner.

Removable storage unit 2006, also called a program storage device or a computer program product, represents a floppy disk, magnetic tape, compact disk, etc. As will be appreciated, the removable storage unit 2006 includes a computer usable storage medium having stored therein computer programs/software and/or data. Such computer programs, when executed, enable the computer system 2000 to perform the features of the present invention as discussed herein. In particular, the computer programs, when executed, enable the CPU 2010 to perform the features of the present invention. Accordingly, such computer programs represent controllers of the computer system 2000. Alternatively, rather than load the particular computer programs of the present invention onto individual computer program products for server 102 and client 104, the computer programs that constitute the present invention can be load on a single computer program product(s) for server 102, only. In such an embodiment, server 102 transfers the requisite client computer programs to client 104, by commercially available network software. Computer programs (also called computer control logic) can also be stored in main memory and/or the secondary memory (e.g., RAM) 2008.

In another embodiment, the present invention is directed to a computer program product comprising a computer readable medium having control logic (computer software) stored therein. The control logic, when executed by CPU 2010, causes CPU 2010 to perform the functions of the invention as described herein.

In another embodiment, the present invention is implemented primarily in hardware using, for example, a hardware state machine. Implementation of the hardware state machine so as to perform the functions described herein will be apparent to persons skilled in the relevant art(s).

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. A graphic user interface-based, client-server computer system for providing a user real time access to database information, stored in a plurality of database systems, for a decision making application, comprising:

client means for providing the user with a menu driven graphical user interface to select features specific to the application; and server means for accessing the plurality of database systems to retrieve attribute information with respect to selected features in response to a request from said client means, wherein said server means is operably connected with said client means and the plurality of database systems, wherein said client means and server means transparently provide and dynamically compile summary information for the user, including said retrieved attribute information and wherein the application is price quoting for a communication service company and said summary information includes access line, customer premise equipment, inter-office channel, and end to end quotes.

2. The system of claim 1, further comprising means for automatically providing the user with mandatory features of the application and means for selecting optional features via the graphical user interface, wherein said system immediately adjusts said summary information in response to the user selections.

3. The system of claim 1, wherein said client and server means process a plurality of requests concurrently.

4. A computer program product for use with a client-server computer system operably connected with a plurality of database systems, providing a user access to information stored in the plurality of database system for an application, said computer program product comprising:

a computer usable medium having a computer readable program code means embodied in said medium for enabling the computer system to provide dynamic and transparent access to the plurality of database systems, said computer readable program code means comprising:

computer readable first program code means for enabling the computer system to provide the user with a menu driven graphical user interface to select features specific to the application;

computer readable second program code means for enabling the computer system to retrieve attribute information with respect to selected features in response to a request from said computer readable first program code means, wherein said computer readable first and second program code means transparently provide and dynamically compile summary information for the user, including said retrieved attributes information and wherein the application is price quoting for a communication service company and said summary information includes access line, customer premise equipment, inter-office channel, and end-to-end quotes.

5. The computer program product of claim 4, further comprising:

computer readable third program code means for enabling the computer system to automatically provide the user with mandatory features of the application; and computer readable fourth program code means for enabling the computer system to immediately adjust said summary information in response to the user selections.

6. The computer program product of claim 4, wherein said computer readable first and second program code means process a plurality of requests concurrently.

7. The system of claim 1, further comprising:

detecting means for alerting the user via said graphical user interface of errors in the client-server computer system.

8. The system of claim 1, wherein said server means further comprises:

communicating means for accessing the plurality of database systems, wherein at least two of the plurality of database systems are:

managed individually by a separate database management system;

running on a different computer;

supported by a different operating system; and connected by a different communication network.

9. The system of claim 2, further comprising:

storing means for saving said summary information;

retrieving means for retrieving said summary information from said storing means; and exporting means for transferring said summary information to another computer system.

10. The computer program product of claim 5, further comprising:

computer readable fifth program code means for storing said summary information;

computer readable sixth program code means for retrieving said summary information; and computer readable seventh program code means for transferring said summary information to another computer system.

11. The computer program product of claim 10, further comprising:

computer readable eighth program code means for alerting the user via said graphical user interface of errors in the client-server computer system.

12. The computer program product of claim 4, wherein said second program code means further comprises:

computer readable program code means for accessing the plurality of database systems, wherein at least two of the plurality of database systems are:

managed individually by a separate database management system;

running on a different computer;

supported by a different operating system; and connected by a different communication network.

13. A client-server computer system for providing a user with the ability to configure a product and/or service, wherein the client-server computer system further includes a graphical user interface (GUI) for providing real-time price quoting summary information, comprising:

means for allowing the user to select optional features that are included to configure the product and/or service via the GUI;

means for transparently accessing a plurality of database systems to retrieve attribute information in response to said selected optional features;

means for dynamically compiling the summary information from said selected optional features and said attribute information;

means for automatically including mandatory features that are further included to configure the product and/or service into the summary information;

means for displaying the summary information to the user via the GUI;

means for storing and retrieving, upon request by the user, the summary information; and means for transferring the summary information to another computer system.

14. The system of claim 13, further comprising:

means for updating the summary information in response to the user selecting a different set of said optional features.

* * * * *